US010590711B2

(12) United States Patent
Chen

(10) Patent No.: US 10,590,711 B2
(45) Date of Patent: Mar. 17, 2020

(54) ROTARY DRILL BIT AND METHOD FOR DESIGNING A ROTARY DRILL BIT FOR DIRECTIONAL AND HORIZONTAL DRILLING

(71) Applicant: Halliburton Energy Services, Inc., Houston, TX (US)

(72) Inventor: Shilin Chen, Montgomery, TX (US)

(73) Assignee: Multi-Chem Group, LLC, Houston, TX (US)

( * ) Notice: Subject to any disclaimer, the term of this patent is extended or adjusted under 35 U.S.C. 154(b) by 0 days.

(21) Appl. No.: 16/039,690

(22) Filed: Jul. 19, 2018

(65) Prior Publication Data

US 2018/0328114 A1  Nov. 15, 2018

Related U.S. Application Data

(62) Division of application No. 14/401,988, filed as application No. PCT/US2012/039977 on May 30, 2012, now Pat. No. 10,036,207.

(51) Int. Cl.
*E21B 10/43* (2006.01)
*B23P 15/32* (2006.01)

(52) U.S. Cl.
CPC .............. *E21B 10/43* (2013.01); *B23P 15/32* (2013.01)

(58) Field of Classification Search
CPC .......... E21B 10/43; E21B 10/42; E21B 10/46; B23P 15/32
See application file for complete search history.

(56) References Cited

U.S. PATENT DOCUMENTS

| 3,153,458 | A | 10/1964 | Short |
| 4,554,986 | A | 11/1985 | Jones |
| 4,991,670 | A | 2/1991 | Fuller et al. |
| 5,090,492 | A | 2/1992 | Keith |
| 5,265,685 | A | 11/1993 | Keith et al. |

(Continued)

FOREIGN PATENT DOCUMENTS

| CN | 2451714 Y | 10/2001 |
| CN | 101427000 | 5/2009 |

(Continued)

OTHER PUBLICATIONS

International Search Report and Written Opinion, Application No. PCT/US2012/039977, 13 pages, Aug. 12, 2012.

(Continued)

*Primary Examiner* — Daniel P Stephenson
(74) *Attorney, Agent, or Firm* — Baker Botts L.L.P.

(57) ABSTRACT

A multi-layer downhole drilling tool designed for directional and horizontal drilling is disclosed. The drilling tool includes a bit body including a rotational axis extending therethrough. A plurality of primary blades are disposed on exterior portions of the bit body and a plurality of secondary blades are disposed on exterior portions of the bit body between the primary blades. The drilling tool further includes a plurality of first-layer cutting elements disposed on exterior portions of the primary blades and a plurality of second-layer cutting elements disposed on exterior portions of the secondary blades. The second-layer cutting elements are track set with the first-layer cutting elements in an opposite track set configuration.

20 Claims, 14 Drawing Sheets

(56) References Cited

U.S. PATENT DOCUMENTS

| | | |
|---|---|---|
| 5,549,171 A | 8/1996 | Mensa-Wilmot et al. |
| 5,551,522 A | 9/1996 | Keith et al. |
| 5,582,261 A | 12/1996 | Keith et al. |
| 5,595,252 A | 1/1997 | O'Hanlon |
| 5,607,024 A | 3/1997 | Keith et al. |
| 6,109,368 A | 8/2000 | Goldman et al. |
| 6,298,930 B1 | 10/2001 | Sinor et al. |
| 6,408,953 B1 | 6/2002 | Goldman et al. |
| 6,460,631 B2 | 10/2002 | Dykstra et al. |
| 6,779,613 B2 | 8/2004 | Dykstra et al. |
| 6,935,441 B2 | 8/2005 | Dykstra et al. |
| 7,032,689 B2 | 4/2006 | Goldman et al. |
| 7,096,978 B2 | 8/2006 | Dykstra et al. |
| 7,261,167 B2 | 8/2007 | Goldman et al. |
| 7,357,196 B2 | 4/2008 | Goldman et al. |
| 7,360,608 B2 | 4/2008 | Brackin et al. |
| 7,464,774 B2 | 12/2008 | Savignat et al. |
| 7,624,818 B2 | 12/2009 | McClain et al. |
| 7,703,557 B2 | 4/2010 | Durairajan et al. |
| 7,762,355 B2 | 7/2010 | McClain et al. |
| 7,861,809 B2 | 1/2011 | Gavia et al. |
| 7,866,413 B2 | 1/2011 | Stauffer et al. |
| 8,863,860 B2 | 10/2014 | Chen et al. |
| 2001/0030063 A1 | 10/2001 | Dykstra et al. |
| 2005/0010382 A1 | 1/2005 | Oliver et al. |
| 2006/0278436 A1 | 12/2006 | Dykstra et al. |
| 2007/0078632 A1 | 4/2007 | Shen |
| 2007/0151770 A1 | 7/2007 | Ganz |
| 2007/0186639 A1 | 8/2007 | Spross et al. |
| 2007/0267227 A1 | 11/2007 | Mensa-Wilmot |
| 2008/0041629 A1 | 2/2008 | Aronstam et al. |
| 2008/0135297 A1 | 6/2008 | Gavia |
| 2009/0090556 A1 | 4/2009 | Chen |
| 2009/0166091 A1 | 7/2009 | Matthews et al. |
| 2009/0266619 A1 | 10/2009 | Durairajan et al. |
| 2010/0000800 A1 | 1/2010 | Chen et al. |
| 2010/0089664 A1 | 4/2010 | Welch et al. |
| 2010/0193248 A1 | 8/2010 | Radford et al. |
| 2010/0263937 A1 | 10/2010 | Overstreet et al. |
| 2011/0030063 A1 | 10/2011 | Choi |
| 2012/0111630 A1 | 5/2012 | Chen et al. |
| 2013/0228378 A1 | 9/2013 | Chen et al. |
| 2013/0233621 A1 | 9/2013 | Chen et al. |
| 2013/0238245 A1 | 9/2013 | Chen et al. |
| 2013/0253836 A1 | 9/2013 | Chen et al. |
| 2015/0122551 A1 | 5/2015 | Chen |
| 2015/0152689 A1 | 6/2015 | Chen et al. |
| 2018/0328114 A1* | 11/2018 | Chen ............... B23P 15/32 |

FOREIGN PATENT DOCUMENTS

| | | | |
|---|---|---|---|
| CN | 101460701 | 6/2009 | |
| CN | 101611213 A | 12/2009 | |
| CN | 102216554 A | 10/2011 | |
| GB | 2498480 | 7/2013 | |
| WO | 2012/064948 | 5/2012 | ............. E21B 47/02 |
| WO | 2012/064953 | 5/2012 | ............. E21B 47/09 |
| WO | 2012/064961 | 5/2012 | ............. E21B 47/09 |
| WO | 2013/180702 | 12/2013 | |

OTHER PUBLICATIONS

Mensa-Wilmot, Graham, "Innovative Cutting Structure, With Staged ROP and Durability Characteristics, Extends PDC Bit Efficiency Into Chert/Pyrite/Conglomerate Applications," Society of Petroleum Engineers 105320, 15th SPE Middle East Oil & Gas Show and Conference, Kingdom of Bahrain, Mar. 11-14, 2007.

International Preliminary Report on Patentability, PCT Application No. PCT/US2012/039977, 7 pages, Dec. 2, 2014.

Great Britain Office Action issued in Appl. No. GB1420604.9; 1 page, Dec. 2, 2014.

Examination Report, Application No. GB1420604.9; 3 pages, Jun. 26, 2015.

Chinese Office Action, Application No. 201280074423.7; with translation; 14 pages, Dec. 2, 2015.

International Preliminary Report on Patentability of PCT/US2013/073583, dated Jun. 16, 2016, 9 pages.

European Extended Search Report of Application No. 12880858.1 dated Jan. 4, 2016, 5 pages.

Canadian Office Action Application No. 2879046, dated Feb. 24, 2016, 4 pages.

Canadian Office Action Application No. 2875021, dated Jan. 13, 2016, 4 pages.

Chinese Office Action Application No. 201280074423.7, dated Aug. 17, 2016, 13 pages.

Canadian Office Action Application No. 2929078, dated Apr. 3, 2017, 4 pages.

Canadian Office Action Application No. 2879046, dated Mar. 27, 2017, 4 pages.

Chinese Office Action Application No. 201380080165.8, dated May 3, 2017; 9 pages.

* cited by examiner

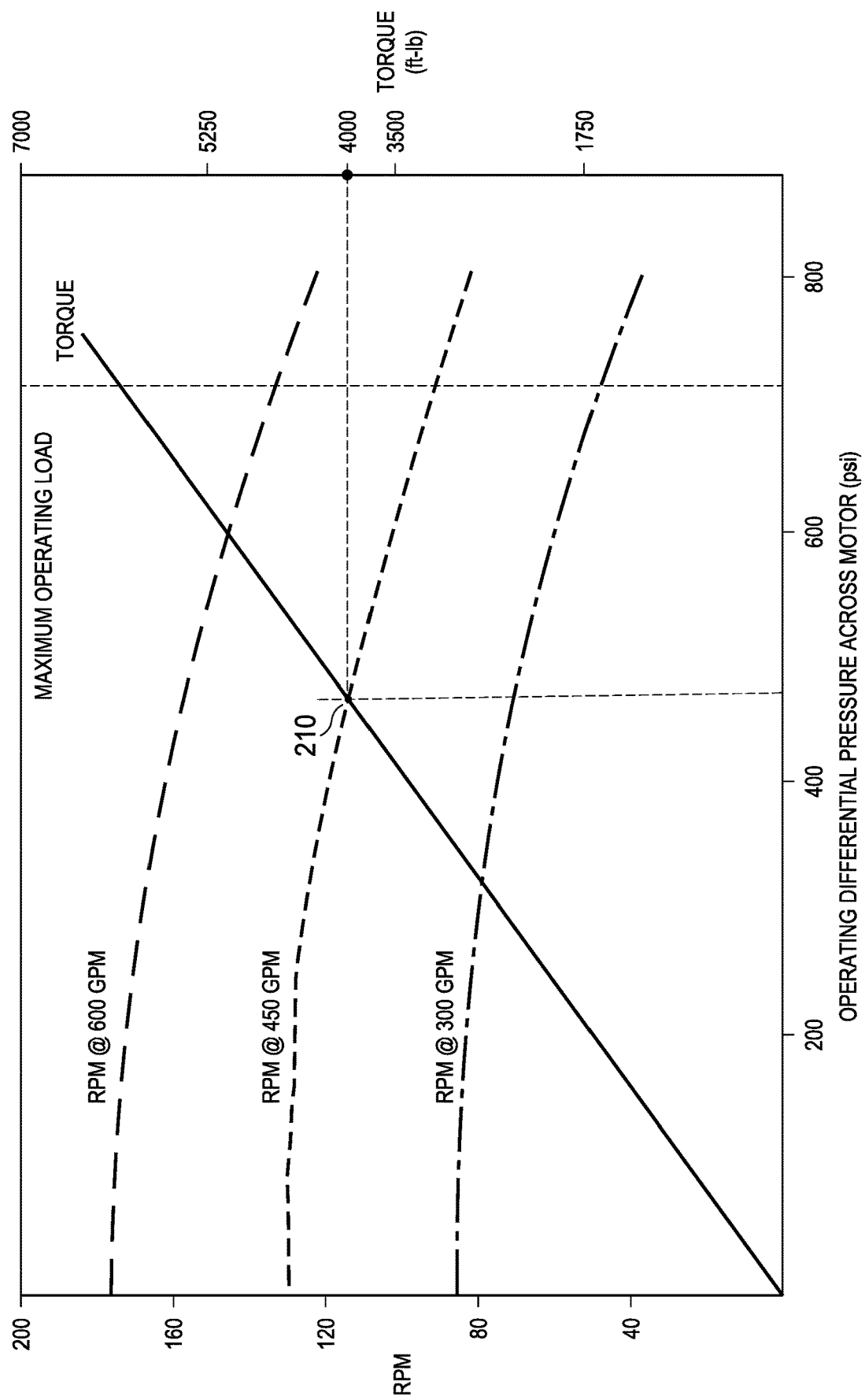

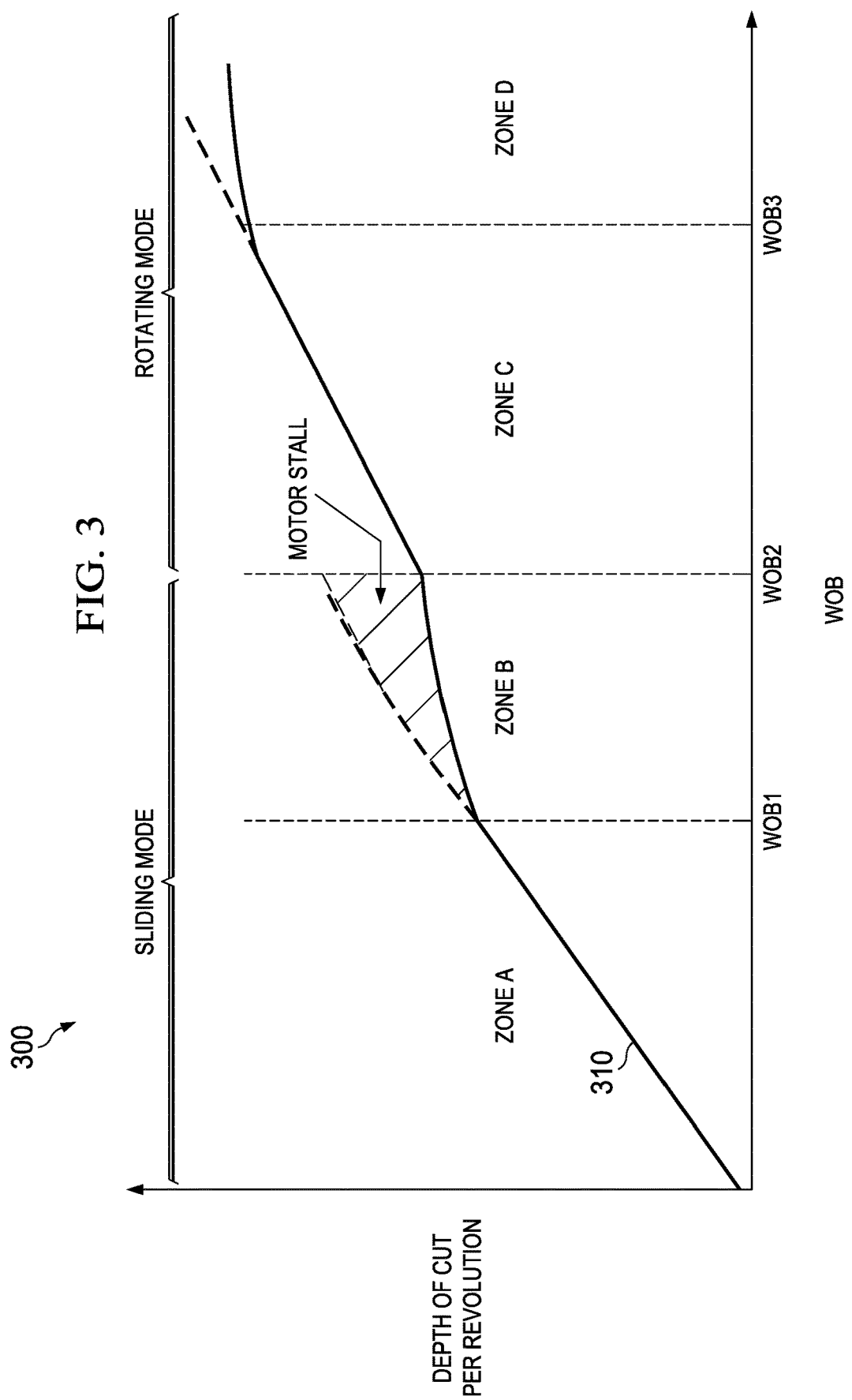

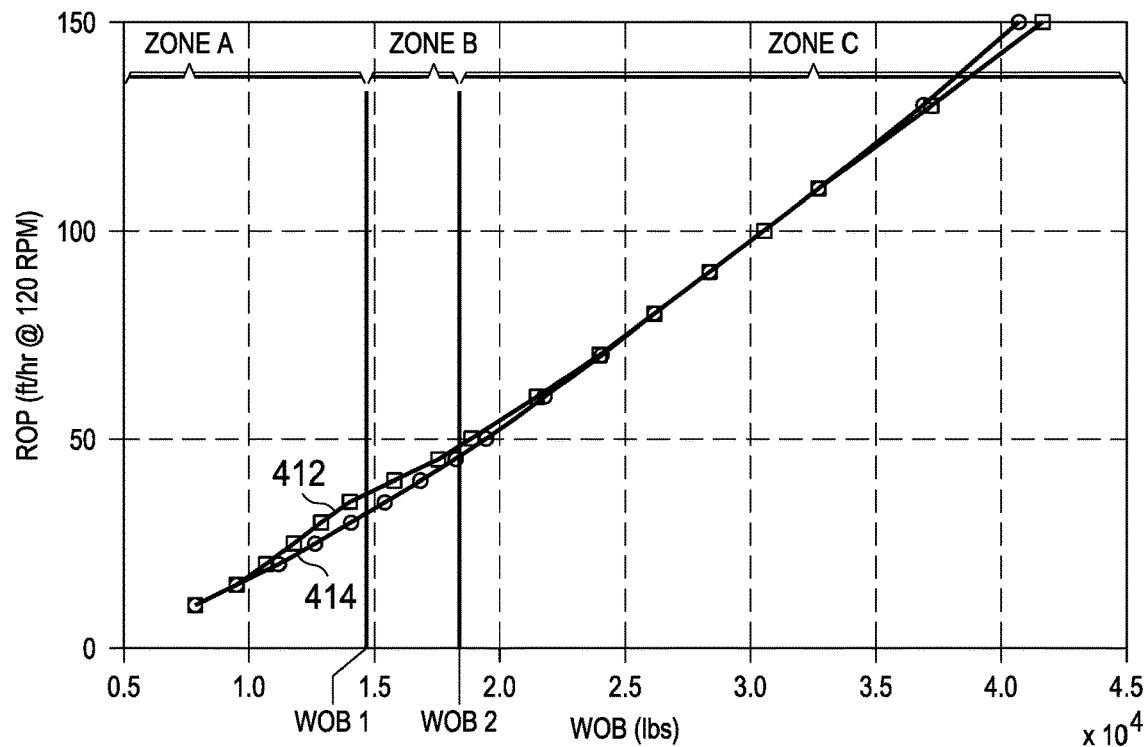
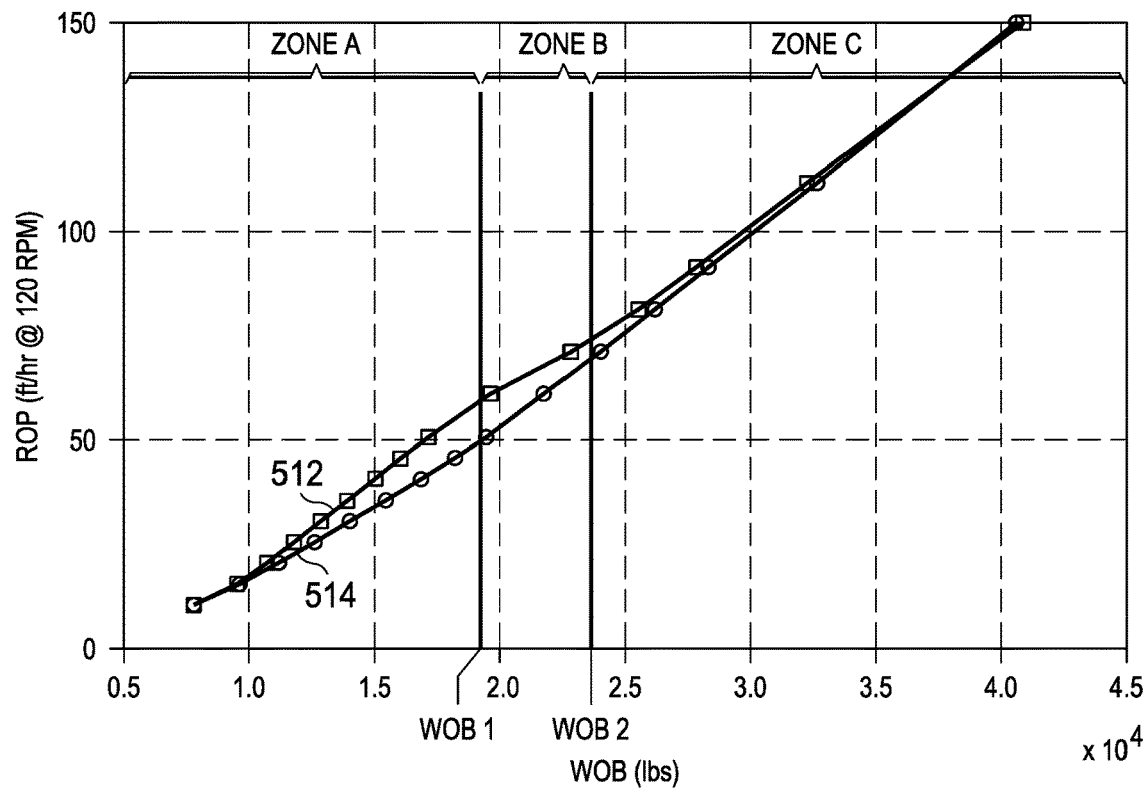

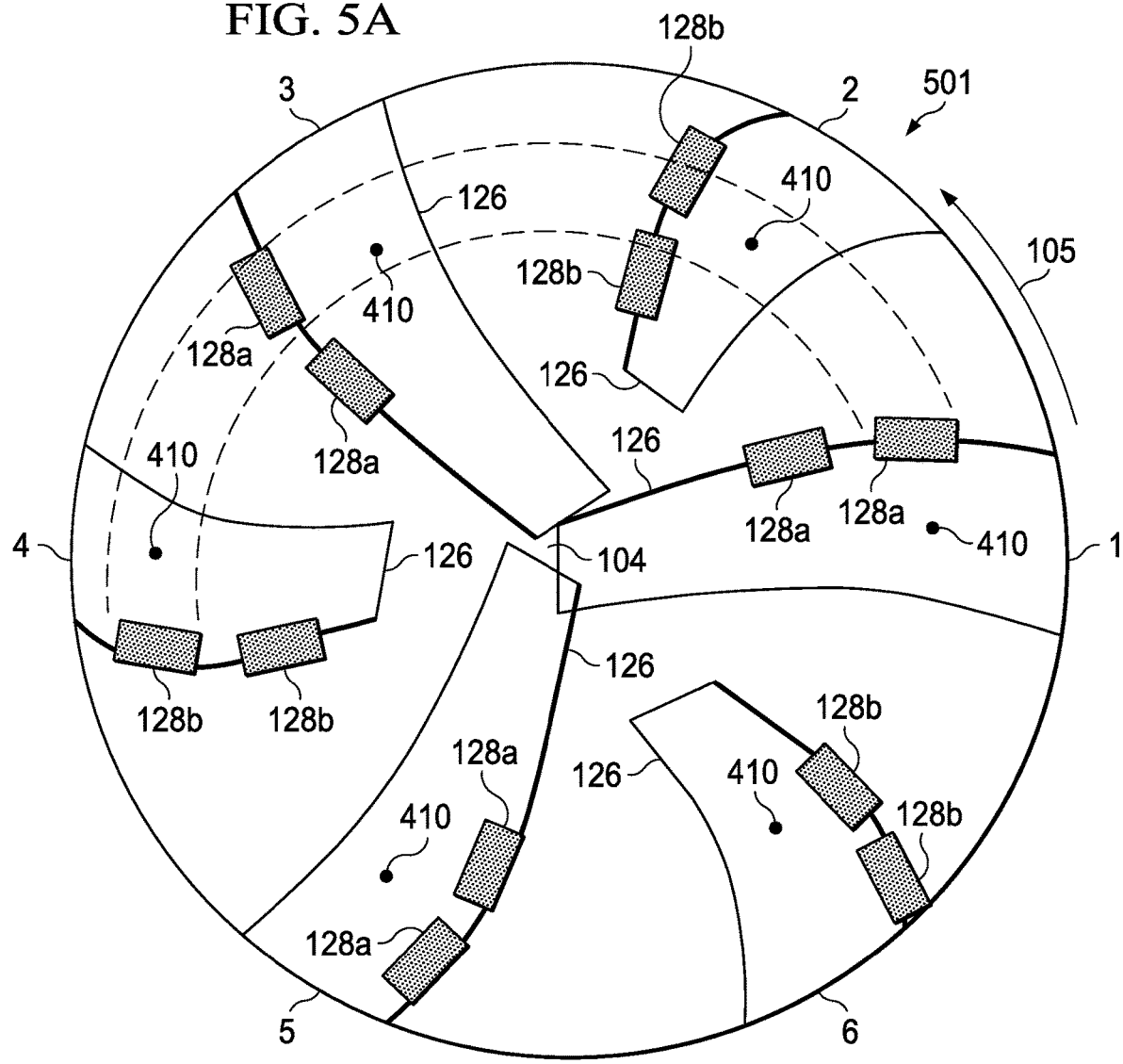

ROTARY DRILL BIT AND METHOD FOR DESIGNING A ROTARY DRILL BIT FOR DIRECTIONAL AND HORIZONTAL DRILLING

RELATED APPLICATIONS

This application is a Divisional of U.S. application Ser. No. 14/401,988 filed Nov. 18, 2014, which is a U.S. National Stage Application of International Application No. PCT/US2012/039977 filed May 30, 2012, which designates the United States, and which are incorporated herein by reference in their entirety.

TECHNICAL FIELD

The present disclosure relates generally to downhole drilling tools and, more particularly, to rotary drill bits and a method for designing rotary drill bits for directional and horizontal drilling.

BACKGROUND

Various types of downhole drilling tools including, but not limited to, rotary drill bits, reamers, core bits, and other downhole tools have been used to form wellbores in associated downhole formations. Examples of such rotary drill bits include, but are not limited to, fixed cutter drill bits, drag bits, polycrystalline diamond compact (PDC) drill bits, and matrix drill bits associated with forming oil and gas wells extending through one or more downhole formations. Fixed cutter drill bits such as PDC bits may include multiple blades that each include multiple cutting elements.

In typical drilling applications, a drill bit may be used in directional and horizontal drilling. Often in directional and horizontal drilling, the drill bit will drill vertically to a certain kickoff location where the drill bit will begin to curve into the formation, and at a certain point, the drill bit will begin horizontal drilling. One of the purposes of directional and horizontal drilling is to increase drainage of a reservoir into the wellbore and increase production from a well.

When drilling vertical wellbores, the drill string and various other items located above the drill bit supply the desired force on the bit, usually referred to as the weight on bit (WOB). The WOB enables the bit to adequately engage the formation with a sufficient rate of penetration (ROP) and depth of cut. However, as the wellbore begins to change from vertical to horizontal, the drill string is held against the lower wall of the wellbore by gravity. Under these conditions, the portion of the drill string in the kickoff and horizontal portions of the wellbore may not exert any weight on the bit because the drill string weight is exerted against the lower wall of the wellbore. This leads to very small WOB and a low ROP. Thus, in directional and horizontal drilling, any force used to turn the drill bit must overcome the friction between the drill string and the lower wall of the wellbore. Additionally, the torque required to turn the drill bit in some directional and horizontal drilling is supplied only by a downhole motor and is therefore very limited. This limited torque may lead to "motor stall" if the instant depth of cut of the drill bit is so high that the combination of torque and revolutions per minute (RPM) produced by the motor is not sufficient to effectively rotate the drill bit.

SUMMARY

In accordance with teachings of the present invention, disadvantages and problems associated with directional and horizontal drilling using a rotary drill bit have been substantially reduced or eliminated. In a particular embodiment, a multi-layer downhole drilling tool designed for directional and horizontal drilling is disclosed. The drilling tool includes a bit body including a rotational axis extending therethrough. A plurality of primary blades are disposed on exterior portions of the bit body and a plurality of secondary blades are disposed on exterior portions of the bit body between the primary blades. A plurality of first-layer cutting elements are disposed on exterior portions of the primary blades and a plurality of second-layer cutting elements are disposed on exterior portions of the secondary blades. The second-layer cutting elements are track set with the first-layer cutting elements in an opposite track set configuration.

In accordance with one embodiment of the present invention a multi-layer downhole drilling tool designed for directional and horizontal drilling is disclosed. The drilling tool includes a bit body including a rotational axis extending therethrough. A plurality of primary blades are disposed on exterior portions of the bit body and a plurality of secondary blades are disposed on exterior portions of the bit body between the primary blades. A plurality of first-layer cutting elements are disposed on exterior portions of the primary blades and a plurality of second-layer cutting elements are disposed on exterior portions of the secondary blades. The second-layer cutting elements are track set with the first-layer cutting elements in a front track set configuration.

In accordance with another embodiment of the present invention, a method for designing a multi-profile layer drill bit to provide directional and horizontal drilling is disclosed. The method includes placing a plurality of first-layer cutting elements on a plurality of primary blades disposed on exterior portions of a bit body and defining a cutting element configuration from a front track set configuration or an opposite track set configuration. A weight on bit where second-layer cutting elements engage a formation during drilling is estimated based on a formation characteristic of a wellbore and a rotation speed of a motor associated with the drill bit. An amount of under-exposure between the second-layer cutting elements and first-layer cutting elements is determined and the second-layer cutting elements are placed on a plurality of secondary blades according to the cutting element configuration and the determined under-exposure in order to prevent the motor from stalling during sliding mode drilling.

BRIEF DESCRIPTION OF THE DRAWINGS

For a more complete understanding of the present disclosure and its features and advantages, reference is now made to the following description, taken in conjunction with the accompanying drawings, in which:

FIG. 2B illustrates a graph of output torque of a motor as a function of rotational speed, fluid speed, and differential pressure, in accordance with some embodiments of the present disclosure;

FIG. 3 illustrates a graph of the depth of cut per revolution and weight on bit relationship of a drill bit designed in accordance with some embodiments of the present disclosure;

FIG. 4B illustrates a graph of the weight on bit versus rate of penetration for the drill bit of FIG. 4A designed in accordance with some embodiments of the present disclosure;

FIG. 5A illustrates the bit face of a drill bit including cutting elements disposed on blades in an opposite track set configuration, in accordance with some embodiments of the present disclosure;

FIG. 5B illustrates a graph of the weight on bit versus rate of penetration for the drill bit of FIG. 5A designed in accordance with some embodiments of the present disclosure;

DETAILED DESCRIPTION

Embodiments of the present disclosure and its advantages are best understood by referring to FIGS. 1-13, where like numbers are used to indicate like and corresponding parts.

Figure 1:
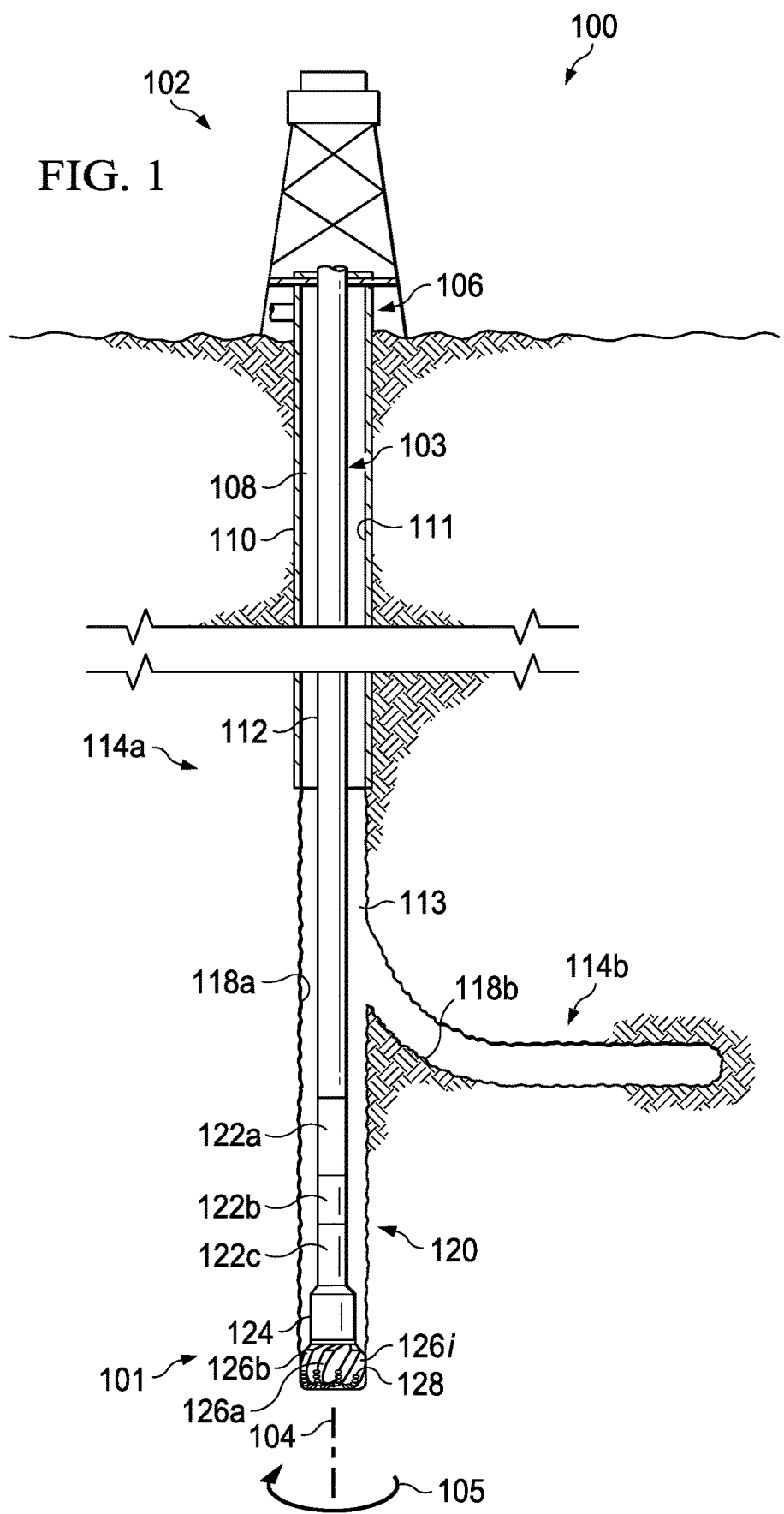
FIG. 1 illustrates an example embodiment of a drilling system in accordance with some embodiments of the present disclosure.

FIG. 1 illustrates an example embodiment of a drilling system 100 configured to provide directional drilling into one or more geological formations, in accordance with various embodiments of the present disclosure. While directional or horizontal drilling, it may be advantageous to control the amount that a downhole drilling tool cuts into a geological formation in order to prevent motor stall when transitioning from vertical to horizontal drilling. As disclosed in further detail below and according to some embodiments of the present disclosure, drilling system 100 may include downhole drilling tools (e.g., a drill bit, a reamer, a hole opener, etc.) that may include one or more cutting elements arranged in multiple layers on the blades of the tool in order to provide a higher drilling efficiency and depth of cut control at a lower weight on bit (WOB) and a normal drilling efficiency at a higher WOB. In some embodiments, the drilling tools may have a first layer of cutting elements arranged on primary blades that are single-set and a second layer of cutting elements arranged on secondary blades that are track-set and under-exposed with respect to the first layer of cutting elements. In some embodiments, the amount of under-exposure may be the same for each of the second layer of cutting elements. In other embodiments, the amount of under-exposure of a second layer of cutting elements may be calculated based on an expected critical depth of cut at which the second layer of cutting elements are expected to cut into formation. In these embodiments, the amount of under-exposure may vary for each of the second layer of cutting elements. In some embodiments, the critical depth of cut may be the same for each of the second layer of cutting elements.

Drilling system 100 may include well surface or well site 106. Various types of drilling equipment such as a rotary table, mud pumps and mud tanks (not expressly shown) may be located at a well surface or well site 106. For example, well site 106 may include drilling rig 102 that may have various characteristics and features associated with a "land drilling rig." However, downhole drilling tools incorporating teachings of the present disclosure may be satisfactorily used with drilling equipment located on offshore platforms, drill ships, semi-submersibles and drilling barges (not expressly shown).

Drilling system 100 may include drill string 103 associated with drill bit 101 that may be used to form a wide variety of wellbores or bore holes such as generally vertical wellbore 114a or generally horizontal wellbore 114b as shown in FIG. 1. Various directional drilling techniques and associated components of bottom hole assembly (BHA) 120 of drill string 103 may be used to form generally horizontal wellbore 114b. For example, lateral forces may be applied to drill bit 101 proximate kickoff location 113 to form generally horizontal wellbore 114b extending from generally vertical wellbore 114a. The term "directional drilling" may be used to describe drilling a wellbore or portions of a wellbore that extend at a desired angle or angles relative to vertical. Such angles may be greater than normal variations associated with straight holes. Directional drilling sometimes may be described as drilling a wellbore deviated from vertical. The term "horizontal drilling" may be used to include drilling in a direction approximately 90 degrees from vertical. The term "directional data" may include any information provided to determine the radius and/or direction that a drill bit should drill into a formation.

BHA 120 may be formed from a wide variety of components configured to form a wellbore 114. For example, components 122a, 122b and 122c of BHA 120 may include, but are not limited to, drill bits (e.g., drill bit 101), drill collars, rotary steering tools, directional drilling tools, downhole drilling motors, reamers, hole enlargers or stabilizers. The number of components such as drill collars and different types of components 122 included in BHA 120 may depend upon anticipated downhole drilling conditions and the type of wellbore that will be formed by drill string 103 and rotary drill bit 101.

Wellbore 114 may be defined in part by casing string 110 that may extend from well surface 106 to a selected downhole location. Portions of wellbore 114 as shown in FIG. 1 that do not include casing string 110 may be described as "open hole." Various types of drilling fluid may be pumped from well surface 106 through drill string 103 to attached drill bit 101. Such drilling fluids may be directed to flow from drill string 103 to respective nozzles (item 156 illustrated in FIG. 2) included in rotary drill bit 101. The drilling fluid may be circulated back to well surface 106 through annulus 108 defined in part by outside diameter 112 of drill string 103 and inside diameter 118a of wellbore 114a. Inside diameter 118a may be referred to as the "sidewall" of wellbore 114a. Annulus 108 may also be defined by outside diameter 112 of drill string 103 and inside diameter 111 of casing string 110.

Figure 2A:
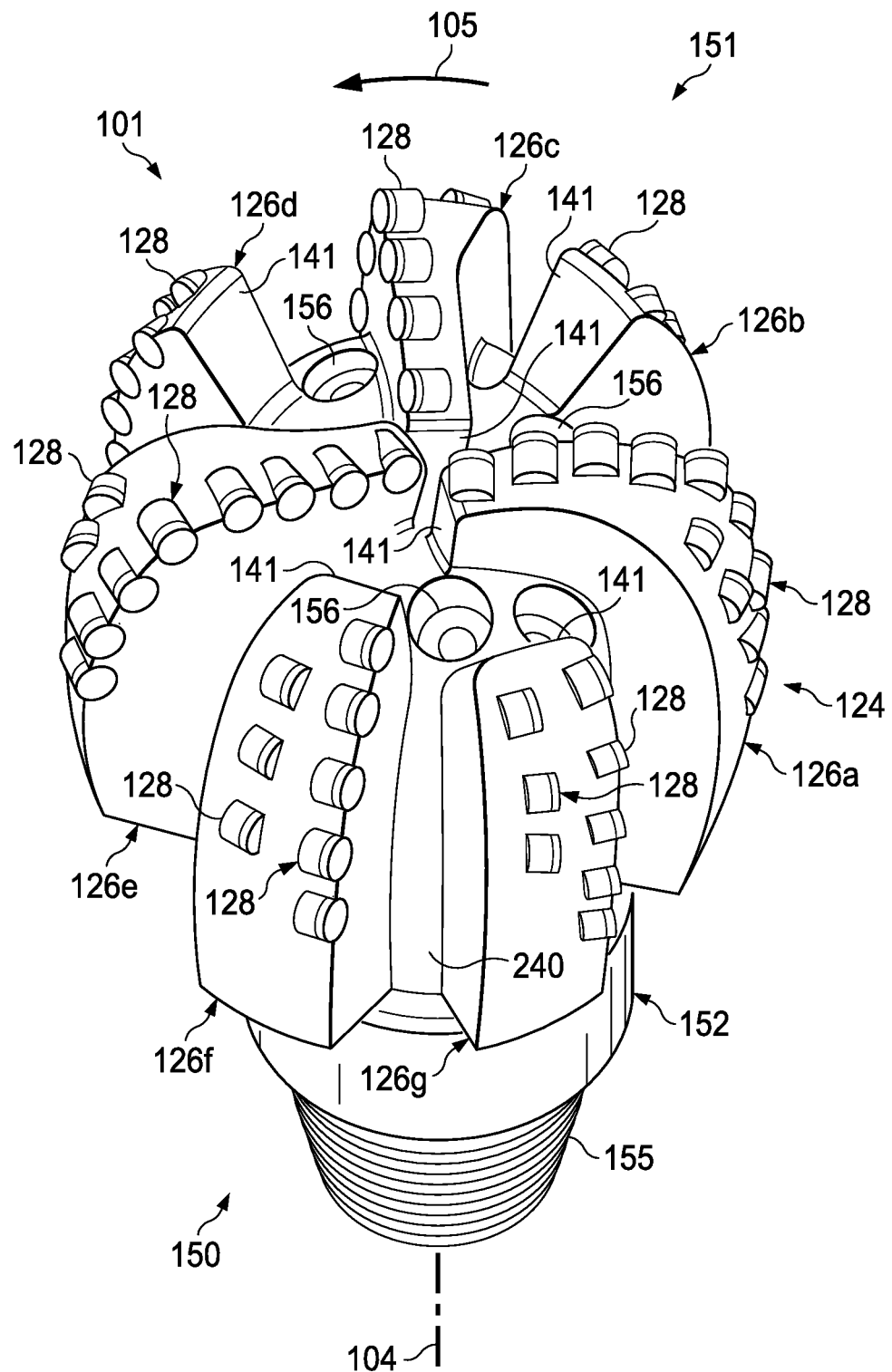
FIG. 2A illustrates an isometric view of a rotary drill bit oriented upwardly in a manner often used to model or design fixed cutter drill bits, in accordance with some embodiments of the present disclosure.

FIG. 2 illustrates an isometric view of a rotary drill bit oriented upwardly in a manner often used to model or design drill bits in accordance with some embodiments on the present disclosure. Drill bit 101 may be any of various types of fixed cutter drill bits, including PDC bits, drag bits, matrix drill bits, and/or steel body drill bits operable to form wellbore 114 extending through one or more downhole formations. Drill bit 101 may be designed and formed in accordance with teachings of the present disclosure and may have many different designs, configurations, and/or dimensions according to the particular application of drill bit 101.

Drill bit 101 may include one or more blades 126 (e.g., blades 126a-126g) that may be disposed outwardly from exterior portions of rotary bit body 124 of drill bit 101. Rotary bit body 124 may have a generally cylindrical body and blades 126 may be any suitable type of projections extending outwardly from rotary bit body 124. For example, a portion of blade 126 may be directly or indirectly coupled to an exterior portion of bit body 124, while another portion of blade 126 is projected away from the exterior portion of bit body 124. Blades 126 formed in accordance with teachings of the present disclosure may have a wide variety of configurations including, but not limited to, substantially arched, helical, spiraling, tapered, converging, diverging, symmetrical, and/or asymmetrical.

In some cases, blades 126 may have substantially arched configurations, generally helical configurations, spiral shaped configurations, or any other configuration satisfactory for use with each downhole drilling tool. One or more blades 126 may have a substantially arched configuration extending from proximate rotational axis 104 of drill bit 101. The arched configuration may be defined in part by a generally concave, recessed shaped portion extending from proximate bit rotational axis 104. The arched configuration may also be defined in part by a generally convex, outwardly curved portion disposed between the concave, recessed portion and exterior portions of each blade which correspond generally with the outside diameter of the rotary drill bit.

Each of blades 126 may include a first end disposed proximate or toward bit rotational axis 104 and a second end disposed proximate or toward exterior portions of drill bit 101 (e.g., disposed generally away from bit rotational axis 104 and toward uphole portions of drill bit 101). The terms "uphole" and "downhole" may be used to describe the location of various components of drilling system 100 relative to the bottom or end of wellbore 114 shown in FIG. 1. For example, a first component described as uphole from a second component may be further away from the end of wellbore 114 than the second component. Similarly, a first component described as being downhole from a second component may be located closer to the end of wellbore 114 than the second component.

Blades 126a-126g may include primary blades disposed about the bit rotational axis. For example, in FIG. 2, blades 126a, 126c, and 126e may be primary blades or major blades because respective first ends 141 of each of blades 126a, 126c, and 126e may be disposed closely adjacent to associated bit rotational axis 104. In some embodiments, blades 126a-126g may also include at least one secondary blade disposed between the primary blades. Blades 126b, 126d, 126f, and 126g shown in FIG. 2 on drill bit 101 may be secondary blades or minor blades because respective first ends 141 may be disposed on downhole end 151 a distance from associated bit rotational axis 104. The number and location of secondary blades and primary blades may vary such that drill bit 101 includes more or less secondary and primary blades. Blades 126 may be disposed symmetrically or asymmetrically with regard to each other and bit rotational axis 104 where the disposition may be based on the downhole drilling conditions of the drilling environment. In some cases, blades 126 and drill bit 101 may rotate about rotational axis 104 in a direction defined by directional arrow 105.

Each blade may have a leading (or front) surface disposed on one side of the blade in the direction of rotation of drill bit 101 and a trailing (or back) surface disposed on an opposite side of the blade away from the direction of rotation of drill bit 101. Blades 126 may be positioned along bit body 124 such that they have a spiral configuration relative to rotational axis 104. In other embodiments, blades 126 may be positioned along bit body 124 in a generally parallel configuration with respect to each other and bit rotational axis 104.

Blades 126 may include one or more cutting elements 128 disposed outwardly from exterior portions of each blade 126. For example, a portion of cutting element 128 may be directly or indirectly coupled to an exterior portion of blade 126 while another portion of cutting element 128 may be projected away from the exterior portion of blade 126. Cutting elements 128 may be any suitable device configured to cut into a formation, including but not limited to, primary cutting elements, backup cutting elements, secondary cutting elements or any combination thereof. By way of example and not limitation, cutting elements 128 may be various types of cutters, compacts, buttons, inserts, and gage cutters satisfactory for use with a wide variety of drill bits 101.

Cutting elements 128 may include respective substrates with a layer of hard cutting material disposed on one end of each respective substrate. The hard layer of cutting elements 128 may provide a cutting surface that may engage adjacent portions of a downhole formation to form wellbore 114. The contact of the cutting surface with the formation may form a cutting zone associated with each of cutting elements 128. The edge of the cutting surface located within the cutting zone may be referred to as the cutting edge of a cutting element 128.

Each substrate of cutting elements 128 may have various configurations and may be formed from tungsten carbide or other materials associated with forming cutting elements for rotary drill bits. Tungsten carbides may include, but are not limited to, monotungsten carbide (WC), ditungsten carbide ($W_2C$), macrocrystalline tungsten carbide and cemented or sintered tungsten carbide. Substrates may also be formed using other hard materials, which may include various metal alloys and cements such as metal borides, metal carbides, metal oxides and metal nitrides. For some applications, the hard cutting layer may be formed from substantially the same materials as the substrate. In other applications, the hard cutting layer may be formed from different materials than the substrate. Examples of materials used to form hard cutting layers may include polycrystalline diamond materials, including synthetic polycrystalline diamonds.

In some embodiments, blades 126 may also include one or more depth of cut controllers (DOCCs) (not expressly shown) configured to control the depth of cut of cutting elements 128. A DOCC may comprise an impact arrestor, a backup cutter and/or an MDR (Modified Diamond Reinforcement). Exterior portions of blades 126, cutting elements 128 and DOCCs (not expressly shown) may form portions of the bit face.

Blades 126 may further include one or more gage pads (not expressly shown) disposed on blades 126. A gage pad may be a gage, gage segment, or gage portion disposed on exterior portion of blade 126. Gage pads may often contact adjacent portions of wellbore 114 formed by drill bit 101. Exterior portions of blades 126 and/or associated gage pads may be disposed at various angles, positive, negative, and/or parallel, relative to adjacent portions of generally vertical wellbore 114a. A gage pad may include one or more layers of hardfacing material.

Uphole end 150 of drill bit 101 may include shank 152 with drill pipe threads 155 formed thereon. Threads 155 may be used to releasably engage drill bit 101 with BHA 120, described in detail below, whereby drill bit 101 may be rotated relative to bit rotational axis 104. Downhole end 151 of drill bit 101 may include a plurality of blades 126a-126g with respective junk slots or fluid flow paths 240 disposed therebetween. Additionally, drilling fluids may be communicated to one or more nozzles 156.

The rate of penetration (ROP) of drill bit 101 is often a function of both weight on bit (WOB) and revolutions per minute (RPM). Referring back to FIG. 1, drill string 103 may apply weight on drill bit 101 and may also rotate drill bit 101 about rotational axis 104 to form wellbore 114 (e.g., wellbore 114a or wellbore 114b). The depth of cut per revolution (or "depth of cut") may also be based on ROP and RPM of a particular bit and indicates how deeply drill bit cutting elements 128 are engaging the formation.

For some applications a downhole motor or "motor" (not expressly shown) may be provided as part of BHA 120 to also rotate drill bit 101 in order to provide directional and horizontal drilling to form wellbore 114b through kickoff location 113. There are two drilling modes during directional and horizontal drilling using a motor. The first mode may be referred to as "sliding mode" drilling. In this mode, drill string 103 above the motor (not expressly shown) does not rotate in order for drill bit 101 to build/drop an angle and to drill into a curve. Sliding mode drilling may be used primarily to change drilling direction. The second mode may be referred to as "rotating mode" drilling. In this mode, both drill string 103 and the motor (not expressly shown) are rotating. Rotating mode drilling may be used to drill a lateral section or a straight hole as shown in generally horizontal wellbore 114b.

When drilling through a curved section of a wellbore in sliding mode, it may be difficult to transfer axial force to drill bit 101 due to the axial friction between drill string 103 and kickoff downhole wall 118b. As the angle of wellbore 114 changes from essentially vertical to essentially horizontal through kickoff location 113, drill string 103 is held against the lower wall of the wellbore, e.g., kickoff downhole wall 118b, by gravity. In this situation, drill string 103 from kickoff location 113 to generally horizontal wellbore 114b may not exert much force, or WOB, because most of the weight of drill string 103 is exerted on the lower wall of the wellbore. Force, or WOB, exerted on drill bit 101 must overcome the friction between drill string 103 and kickoff downhole wall 118b of wellbore 114. This situation may lead to a small force, or WOB, in sliding mode in addition to a low ROP and depth of cut per revolution.

Additionally, in sliding mode drilling, torque on bit (TOB), which is the torque used to rotate drill bit 101, may be limited because torque may only be provided by the motor (not expressly shown) and not by drilling rig 102. The maximum output torque from the downhole motor (not expressly shown) may be a function of rotational speed expressed as revolutions per minute (RPM), fluid speed expressed as gallons per minute (GPM), and operational differential pressure across the motor expressed in pounds per square inch (psi). Accordingly, FIG. 2B illustrates graph 200 of output torque of a motor as a function of rotational speed, fluid speed, and differential pressure. FIG. 2B may be part of a technical specification that may be provided by a motor manufacturer. One example of a downhole motor is a SperryDrill® or GeoForce® motor (Sperry Drilling Services at Halliburton Company, TX). From FIG. 2B, for a given RPM, GPM, and differential pressure, the maximum output torque may be determined. For example, as shown by point 210, at approximately 130 RPM, approximately 450 GPM, and approximately 470 psi, the output torque may be approximately 4000 ft-lb for a motor having the characteristics illustrated in graph 200 of FIG. 2B. If TOB is larger than approximately 4000 ft-lb, then the motor may stall such that the motor ceases to turn. Motor stall may occur if the instant depth of cut of drill bit 101 is large enough that the combination of TOB and RPM produced by the motor is not sufficient to rotate drill bit 101. To limit the depth of cut, and thereby limit motor stalls, a first type of DOCC elements (not expressly shown) may be installed on drill bit 101 to prevent cutting elements 128 from cutting too deeply into the formation. However, in order for the DOCCs to take effect in sliding mode drilling, the first type of DOCC elements (not expressly shown) may be designed to contact formation at a small depth of cut. The use of DOCCs in sliding mode drilling may reduce the ROP of drill bit 101 in rotating mode drilling where more WOB and TOB may be available.

In rotating mode drilling, more WOB and TOB may be available to drill bit 101 due to the rotation of both drill string 103 and the motor (not expressly shown). Because drill bit 101 may be operated under higher WOB and TOB in rotating drilling mode, there may be concerns regarding the durability or useful life of drill bit 101. A second type of DOCC elements (not expressly shown) may be installed on drill bit 101 to prevent cutting elements 128 from cutting too deeply into the formation. In order for DOCCs to take effect in rotating mode drilling, the second type of DOCC elements may be designed to contact formation at a greater depth of cut than may be provided by the first type of DOCC elements.

Since the first type of DOCC elements may contact the formation at a small depth of cut and may always be in contact with the formation in rotating mode drilling, the first type of DOCC elements may limit the depth of cut not only in sliding mode drilling but additionally in rotating mode drilling. Therefore, even if the first type of DOCC elements may be helpful to avoid motor stall in sliding mode drilling, they may limit the depth of cut in rotating mode drilling. In order to improve the bit design, cutting elements 128 may be divided into first-layer cutting elements and second-layer cutting elements in some embodiments described in further detail below. Second-layer cutting elements may be configured to act as the first type of DOCC elements in sliding mode drilling and may also be configured to act as primary cutting elements in rotating mode drilling.

Accordingly, as described in further detail below, the configuration of cutting elements 128 may be based in part on WOB and a desired ROP or depth of cut per revolution of a particular drill bit 101. Drill bit 101 designed according to the present disclosure may provide the desired ROP or depth of cut per revolution and WOB relationship for both directional and horizontal drilling such that drill bits designed in accordance with the present disclosure may function according to design.

FIG. 3 illustrates graph 300 of a desired relationship between depth of cut per revolution (or ROP at a particular RPM) and WOB during the transition from sliding mode drilling at kickoff location 113 to rotating mode drilling in horizontal wellbore 114b for a drill bit 101 designed in accordance with some embodiments of the present disclosure. The beginning of Zone A may correspond to drill bit 101 entering sliding mode drilling. As WOB increases in Zone A, depth of cut per revolution may increase linearly as shown by plot 310. If depth of cut per revolution continues to increase at the same rate in Zone B as it did in Zone A, the motor may stall because the torque provided by the motor may not be sufficient to rotate drill bit 101 at a large depth of cut.

Thus, as the WOB increases past WOB1 and enters Zone B, drill bit 101 may be designed, as described in detail with respect to FIGS. 4B and 5B, to reduce the slope of the depth of cut per revolution, shown in plot 310, in order to prevent motor stall. The value of WOB1 may be determined based on the maximum torque output of a motor, first-layer cutting elements, and the formation type of the wellbore being drilled. WOB2 may be determined based on the maximum load (axial force) of a motor, dogleg severity (DLS), which may be expressed as degrees per 100 feet of drilling, and the BHA (e.g., BHA 120 illustrated in FIG. 1) to be utilized.

Zone C may correspond to drill bit 101 entering rotating mode drilling to drill a substantially straight wellbore or horizontal wellbore 114b. A transition is made from sliding mode drilling to rotating mode drilling at WOB2 where drill string 103 reengages and begins rotating drill bit 101. The additional torque provided by drill string 103 may allow depth of cut per revolution to increase at a higher rate without the high risk of motor stall. Finally in Zone D, when the WOB is greater than WOB3, drill bit 101 designed according the embodiments disclosed herein may benefit from the capability to control the depth of cut per revolution to avoid overcutting into the formation.

Drill bit 101 configured in accordance with embodiments of the present disclosure may include blades 126, cutting elements 128 and DOCCs (not expressly shown) that enable an efficient transition from sliding mode drilling to rotating mode drilling. Drill bit 101 optimized for drilling in both sliding and rotating modes may include:

(a) first-layer cutting elements on primary blades that may engage at all levels of WOB;

(b) second-layer cutting elements on secondary blades that may begin to engage the formation at a WOB greater than WOB1; and (c) DOCC elements that may be designed to control depth of cut at a WOB greater than WOB3.

Depth of cut per revolution ($\Delta$), shown as the vertical axis in FIG. 3, may be expressed as a function of rate of penetration (ROP) and bit rotational speed (RPM) using the following equation:

$$\Delta = ROP/(5*RPM)$$

Depth of cut per revolution may have a unit of inches per bit revolution and ROP may have units of feet per hour. Simulations may be performed in accordance with some embodiments of the present disclosure to generate a graph of ROP and WOB for a particular configuration of drill bit 101. These graphs may be used to configure cutting elements 128 such that the ROP and WOB plot is similar to the target depth of cut per revolution and WOB plot shown in FIG. 3. As noted, such a configuration may serve to limit motor stall.

Figure 4A:
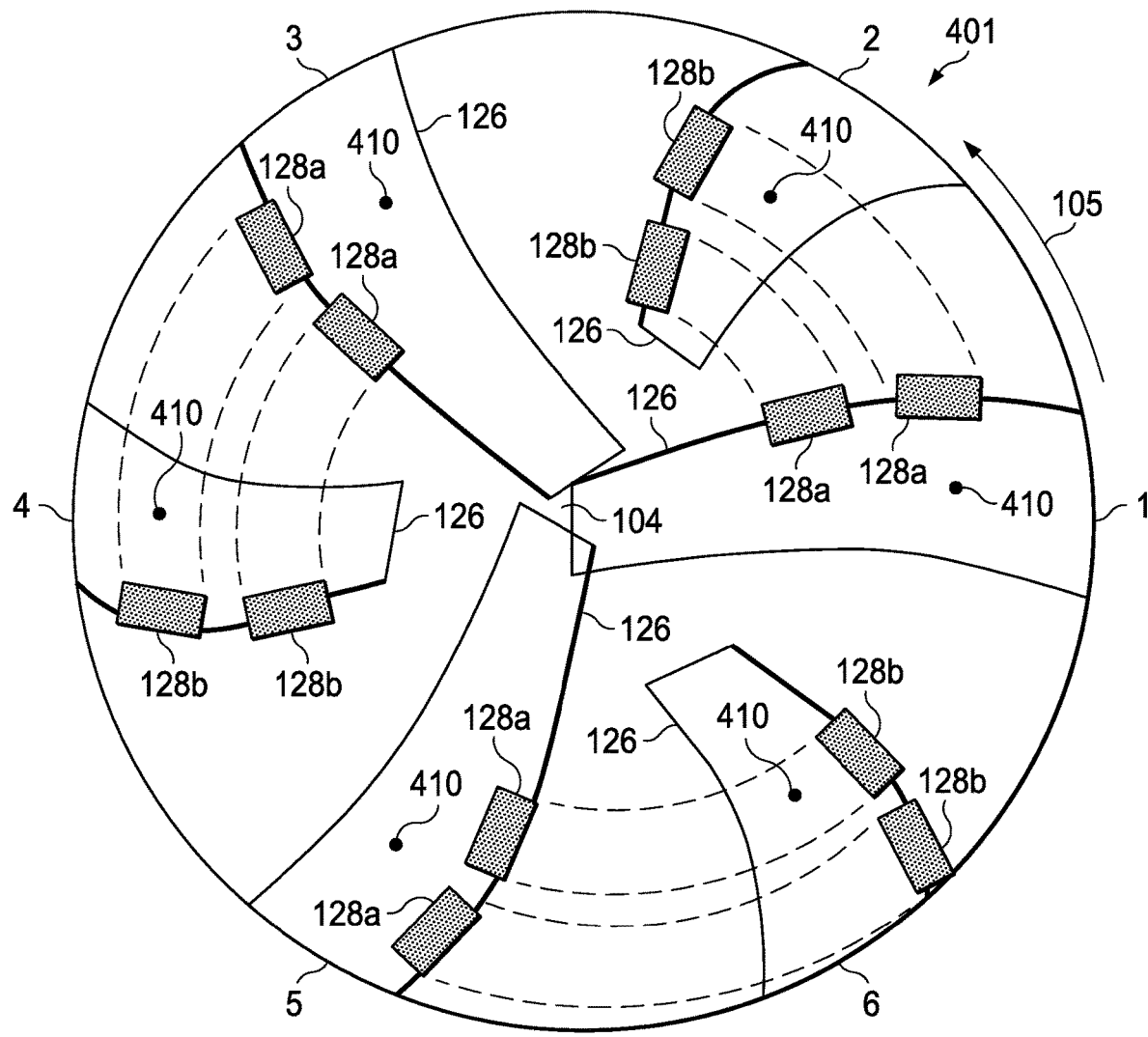
FIG. 4A illustrates the bit face of a drill bit including cutting elements disposed on blades in a front track set configuration, in accordance with some embodiments of the present disclosure.

FIG. 4A illustrates the bit face of a drill bit including cutting elements disposed on blades in a front track set configuration in accordance with some embodiments of the present disclosure. Track set may refer to placing cutting elements on a bit face such that they have the same radial correspondence and overlap in a radial swath as the drill bit rotates. In a front track set configuration, the secondary cutting elements may be placed in front of the primary cutting elements with respect to rotation of the drill bit.

In the illustrated embodiment, blades 126 of drill bit 401 may be divided into groups including primary blades (1, 3, 5) and secondary blades (2, 4, 6). First-layer cutting elements 128a may be placed on primary blades (1, 3, 5) and corresponding second-layer cutting elements 128b may be placed on secondary blades (2, 4, 6), which are respectively located in front of primary blades (1, 3, 5) with respect to the direction of rotation around bit rotational axis 104 as indicated by rotational arrow 105. Corresponding second-layer cutting elements 128b may be track set with corresponding first-layer cutting elements 128a, e.g., placed in the same radial position from the bit rotational axis 104, such that drill bit 401 is designed with a front track set configuration. Additionally, first-layer cutting elements 128a on primary blades (1, 3, 5) may be single set such that they have a unique radial position with respect to bit rotational axis 104. Moreover, drill bit 401 may include DOCCs 410 disposed on primary blades (1, 3, 5) or secondary blades (2, 4, 6).

In the illustrated configuration, second-layer cutting elements 128b on secondary blade (2) may be track set with first-layer cutting elements 128a on primary blade (1) to form set (2,1). Second-layer cutting elements 128b on secondary blade (4) may be track set with first-layer cutting elements on primary blade (3) to form set (4,3). Likewise, second-layer cutting elements 128b on secondary blade (6) may be track set with first-layer cutting elements on primary blade (5) to form set (6,5). First-layer cutting elements 128a on primary blades (1, 3, 5) may form the first-layer profile and second-layer cutting elements 128b on secondary blades (6, 2, 4) may be under-exposed with respect to first-layer cutting elements 128a to form the second-layer profile.

As an example embodiment of the present disclosure, FIG. 4A illustrates six-bladed drill bit 401 and second-layer cutting elements 128b are shown placed on secondary blades (2, 4, 6) one blade in front of corresponding first-layer cutting elements 128a on primary blades (1, 3, 5). However, drill bit 401 may include more or fewer blades than shown in FIG. 4A. For example, a seven-bladed drill bit may include primary blades (1, 4, 6) and secondary blades (2, 3, 5, 7). Second-layer cutting elements 128b may be placed on secondary blade (2) while corresponding first-layer cutting elements 128a may be placed on primary blade (1). Second-layer cutting elements 128b on secondary blade (2) may be track set with first-layer cutting elements on primary blade (1) to form set (2,1) and may be referred to as "one blade front track set." Other sets in a seven-blade front track set configuration may include (3,1), (5,4), and (7,6). Further, first-layer cutting elements may be single set with respect to other first-layer cutting elements on blades (1, 4, 6). In another example, a nine-bladed drill bit may include primary blades (1, 4, 7) and secondary blades (2, 3, 5, 6, 8, 9). Second-layer cutting elements 128b may be placed on secondary blade (2) while corresponding first-layer cutting elements 128a may be placed on primary blade (1). Additionally, third-layer cutting elements (not expressly shown) may be placed on secondary blade (3). Second-layer cutting elements 128b on secondary blade (2) and third-layer cutting elements on secondary blade (3) may be track set with first-layer cutting elements on primary blade (1) to form set (3,2,1). Other sets in a nine-blade front track set configuration may include (9,8,7) and (6,5,4). Further, first-layer cutting elements 128a may be single set with respect to other first-layer cutting elements on blades (1, 4, 7). In some embodiments, second-layer cutting elements 128b and third-layer cutting elements (not expressly shown) may be placed one or more blades in front of corresponding first-layer cutting element 128a. Accordingly, the present disclosure may apply to multiple configurations of drill bits with varied blade numbers and varied cutting element placements.

FIG. 4B illustrates graph 400 of WOB versus ROP for drill bit 401 including the front track set configuration illustrated in FIG. 4A, in accordance with some embodiments of the present disclosure. In the illustrated embodiment, graph 400 was generated for drill bit 401 based on a simulation using a rotation rate of approximately 120 RPM, a formation with an unconfined rock strength of approximately 18,000 psi, a drill bit size of approximately 9.875 inches, and second-layer cutting element under-exposure of approximately 0.045 inches. The graph illustrates two plots: plot 412 that corresponds to drill bit 401 with cutting elements 128 disposed in a front track set configuration as illustrated in FIG. 4A and plot 414 that corresponds to a conventional single set drill bit.

As is shown from FIG. 4B, a front track set drill bit (e.g., drill bit 401 illustrated in FIG. 4A) exhibits an inflection point when moving from Zone A to Zone B (at WOB1 approximately equal to 14,000 lbs) during sliding mode drilling, and another inflection point when moving from Zone B to Zone C (at WOB2 approximately equal to 17,500 lbs) during the transition from sliding mode drilling to rotating mode drilling. These inflection points of plot 412 may indicate that second-layer cutting elements 128b on secondary blades (2, 4, 6) may not touch the formation in Zone A, and therefore, drill bit 401 may drill faster in Zone A. In Zone B, second-layer cutting elements 128b may begin to cut formation and the slope plot 412 may be reduced. Therefore, second-layer cutting elements 128b may act as depth of cut controllers in Zone B. Thus, the configuration of cutting elements 128 shown in FIG. 4A may drill faster during sliding mode drilling in the lower WOB range (e.g., Zone A) than the conventional single set design shown in plot 414. In Zone B, second-layer cutting elements 128b may begin to remove formation and thus, prevent motor stall. Once the WOB reaches Zone C, all cutting elements 128 may be removing formation. Thus, drill bit 401 including a front track set configuration as illustrated in FIG. 4A may exhibit the desired relationship between depth of cut per revolution (or ROP at a particular RPM) and WOB (e.g., as illustrated in FIG. 3) during sliding mode drilling and rotating mode drilling.

FIG. 5A illustrates the bit face of a drill bit including cutting elements disposed on blades in an opposite track set configuration in accordance with some embodiments of the present disclosure. In an opposite track set configuration, the secondary cutting elements may be placed substantially opposite, e.g. approximately 180 degrees, from the primary cutting elements with respect to rotation of the drill bit.

In the illustrated configuration, second-layer cutting elements 128b on secondary blade (4) may be track set with first-layer cutting elements 128a on primary blade (1) to form set (4,1). Second-layer cutting elements 128b on secondary blade (6) may be track set with first-layer cutting elements 128a on primary blade (3) to form set (6,3). Likewise, second-layer cutting elements 128b on secondary blade (2) may be track set with first-layer cutting elements 128a on primary blade (5) to form set (2,5). First-layer cutting elements 128a on primary blades (1, 3, 5) may form the first-layer profile and second-layer cutting elements 128b on secondary blades (4, 6, 2) may be under-exposed with respect to first-layer cutting elements 128a to form the second-layer profile. Additionally, drill bit 501 may include DOCCs 410 disposed on primary blades (1, 3, 5) or secondary blades (4, 6, 2)

As an example embodiment of the present disclosure, FIG. 5A illustrates a six bladed drill bit 501 and second-layer cutting elements 128b may be placed three blades in front of corresponding first-layer cutting elements 128a. However, drill bit 501 may include more or fewer blades than shown in FIG. 5A. For example, a seven-bladed drill bit may include primary blades (1, 4, 6) and secondary blades (2, 3, 5, 7). Second-layer cutting elements 128b may be placed on secondary blade (5) while corresponding first-layer cutting elements 128a may be placed on primary blade (1). Second-layer cutting elements 128b on secondary blade (5) may be track set with first-layer cutting elements 128a on primary blade (1) to form set (5,1). Other sets in a seven-blade opposite track set configuration may include (3,6) and (7,4). Further, first-layer cutting elements 128a may be single set with respect to other first-layer cutting elements 128a on blades (1, 4, 6). In another example, a nine-bladed drill bit may include primary blades (1, 4, 7) and secondary blades (2, 3, 5, 6, 8, 9). Second-layer cutting elements 128b may be placed on secondary blade (5) while corresponding first-layer cutting elements 128a may be placed on primary blade (1). Second-layer cutting elements 128b on secondary blade (5) may be track set with first-layer cutting elements 128a on primary blade (1) to form set (5,1). Other sets in a nine-blade opposite track set configuration may include (6,1), (2,7), (3,7), (8,4), and (9,4). Further, first-layer cutting elements 128a may be single set with respect to other first-layer cutting elements 128a on blades (1, 4, 7). Accordingly, the present disclosure may apply to multiple configurations of drill bits with varied blade numbers and varied cutting element placements.

FIG. 5B illustrates graph 500 of WOB versus ROP for drill bit 501 the opposite track set configuration illustrated in FIG. 5A, in accordance with some embodiments of the present disclosure. In the illustrated embodiment, the graph was generated for drill bit 501 based on a simulation using a rotation rate of approximately 120 RPM, a formation with unconfined rock strength of approximately 18,000 psi, a drill bit size of approximately 9.875 inches, and second-layer cutting element under-exposure of approximately 0.045 inches. The graph illustrates two plots: plot 512 that corresponds to drill bit 501 with cutting elements 128 disposed in an opposite track set configuration as illustrated in FIG. 5A and plot 514 that corresponds to a conventional single set drill bit.

As is shown from FIG. 5B, an opposite track set drill bit (e.g., drill bit 501 illustrated in FIG. 5A) exhibits an inflection point when moving from Zone A to Zone B (at WOB1 approximately equal to 20,000 lbs) during sliding mode drilling, and another inflection point when moving from Zone B to Zone C (at WOB2 approximately equal to 23,000 lbs) during the transition from sliding mode drilling to rotating mode drilling. These inflection points of plot 512 may indicate that second-layer cutting elements 128b on secondary blades (2, 4, 6) may not touch the formation in Zone A, and therefore, drill bit 501 may drill faster in Zone A. In Zone B, second-layer cutting elements 128b may begin to cut the formation and the slope of plot 512 may be reduced. Therefore, second-layer cutting elements 128b may act as depth of cut controllers in Zone B. Thus, the configuration of cutting elements 128 shown in FIG. 5A may drill faster during sliding mode drilling in the low WOB range (e.g., Zone A) than the conventional single set design shown in plot 514. In Zone B, second-layer cutting elements 128b may begin to remove formation and thus, prevent motor stall. Once the WOB reaches Zone C, all cutting elements 128 may be removing formation. Drill bit 501 including an opposite track set configuration as illustrated in FIG. 5A may exhibit the desired relationship between depth of cut per revolution (or ROP at a particular RPM) and WOB (e.g., as illustrated in FIG. 3) during sliding mode drilling and rotating mode drilling.

As demonstrated, second-layer cutting elements 128b located on the secondary blades may act as back-up or secondary cutting elements (e.g., in Zone B of FIG. 3). However, configuring second-layer cutting elements 128b as front track set or opposite track set with respect to the first-layer cutting elements may allow for second-layer cutting elements 128b to become major or primary cutting elements when they may be needed (e.g., in Zone C of FIG. 3). The amount of under-exposure of each of second-layer cutting elements 128b determines a critical depth of cut per revolution. The calculation of critical depth of cut per revolution may be described with respect to FIGS. 6-8.

Figure 6A:
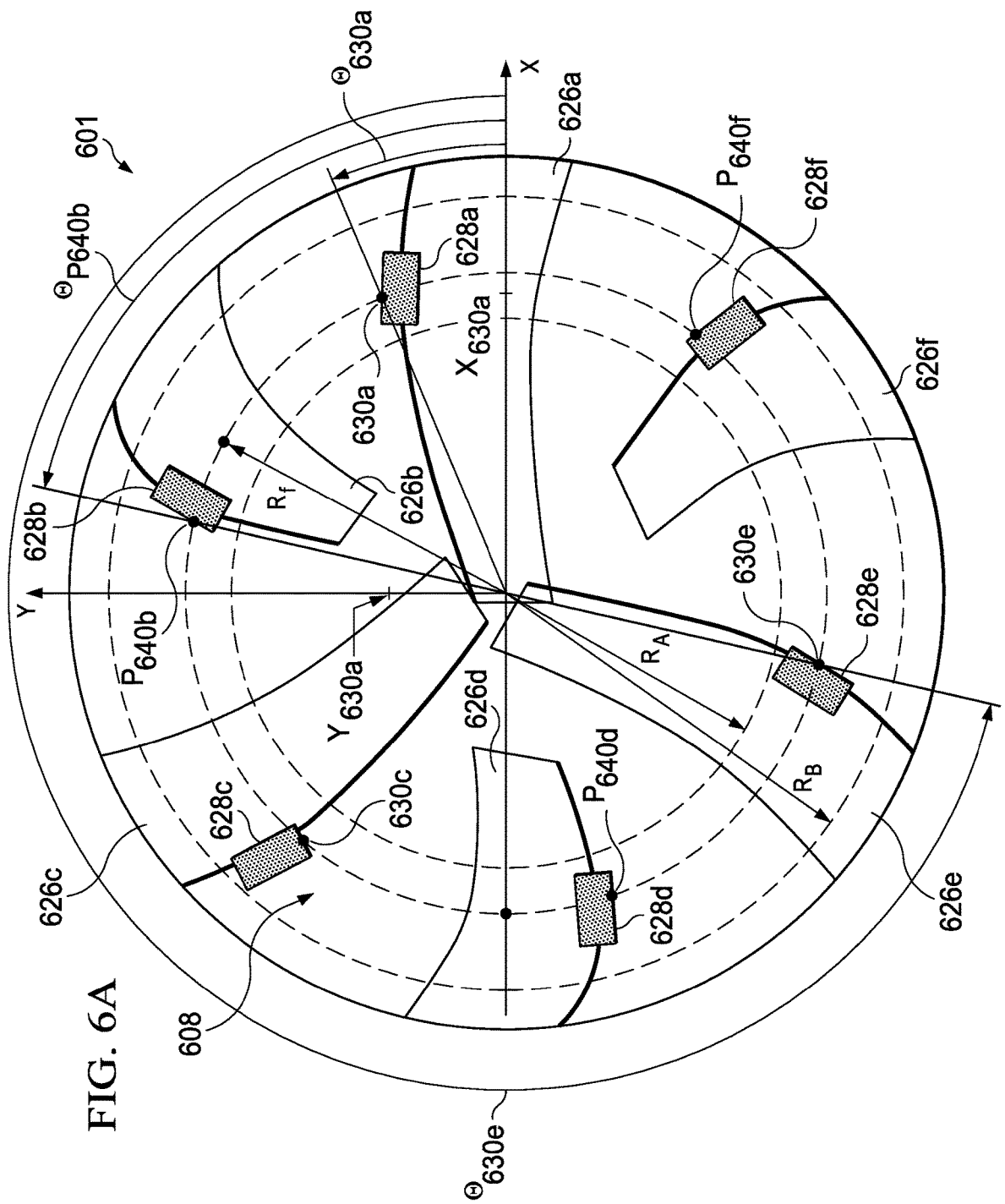
FIG. 6A illustrates the bit face of a drill bit for which a critical depth of cut control curve (CDCCC) may be determined, in accordance with some embodiments of the present disclosure.
Figure 6B:
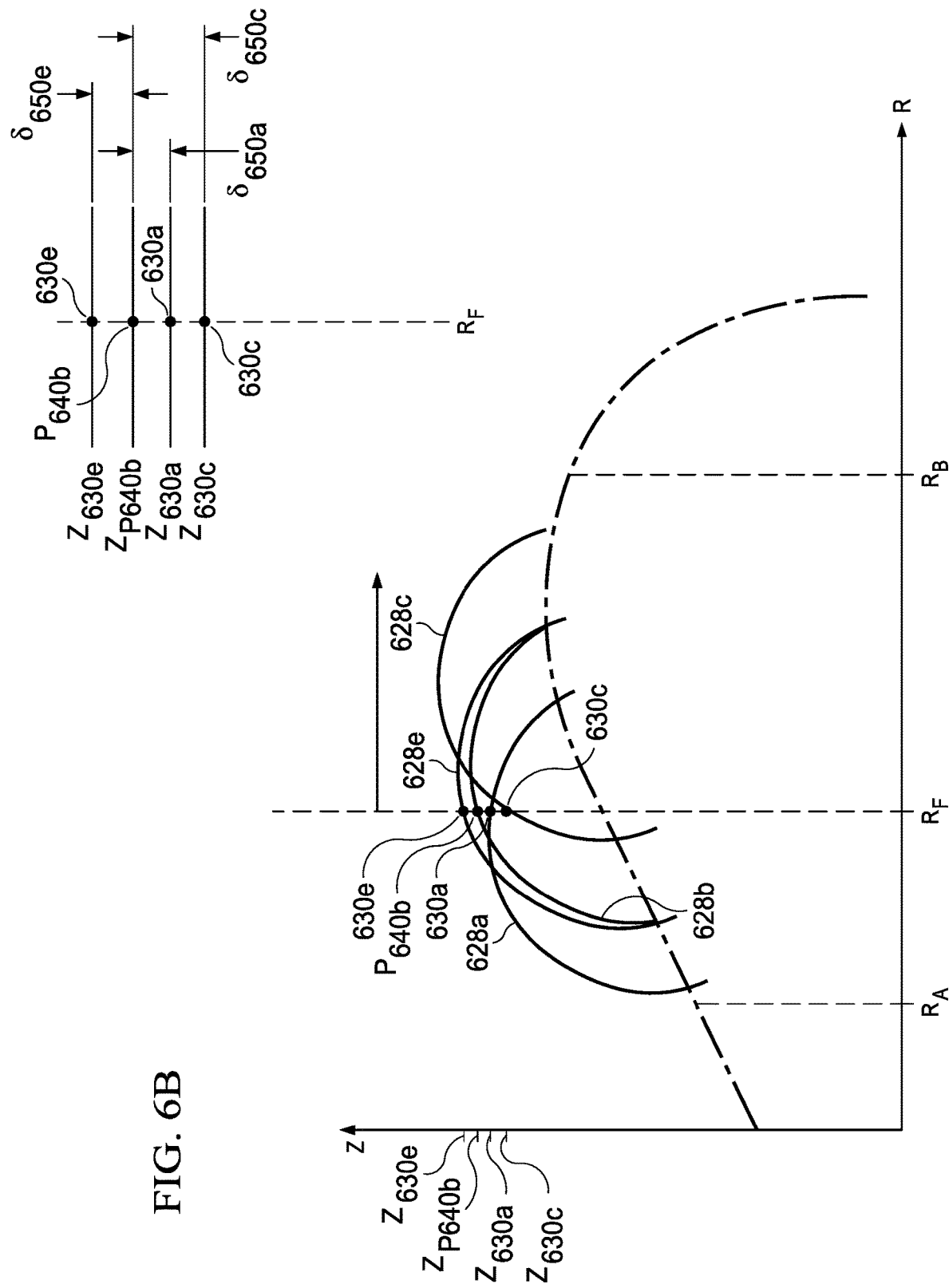
FIG. 6B illustrates a bit face profile of the drill bit of FIG. 6A, in accordance with some embodiments of the present disclosure.

FIG. 6A illustrates the face of a drill bit 601 for which a critical depth of cut control curve (CDCCC) may be determined, in accordance with some embodiments of the present disclosure. FIG. 6B illustrates a bit face profile of drill bit 601 of FIG. 6A.

To provide a frame of reference, FIG. 6B includes a z-axis that may represent the rotational axis of drill bit 601. Accordingly, a coordinate or position corresponding to the z-axis of FIG. 6B may be referred to as an axial coordinate or axial position of the bit face profile depicted in FIG. 6B. FIG. 6B also includes a radial axis (R) that indicates the orthogonal distance from the rotational axis, of drill bit 601.

Additionally, a location along the bit face of drill bit 601 shown in FIG. 6A may be described by x and y coordinates of a xy-plane of FIG. 6A. The xy-plane of FIG. 6A may be substantially perpendicular to the z-axis of FIG. 6B such that the xy-plane of FIG. 6A may be substantially perpendicular to the rotational axis of drill bit 601. Additionally, the x-axis and y-axis of FIG. 6A may intersect each other at the z-axis of FIG. 6B such that the x-axis and y-axis may intersect each other at the rotational axis of drill bit 601.

The distance from the rotational axis of the drill bit 601 to a point in the xy-plane of the bit face of FIG. 6A may indicate the radial coordinate or radial position of the point on the bit face profile depicted in FIG. 6B. For example, the radial coordinate, r, of a point in the xy-plane having an x-coordinate, x, and a y-coordinate, y, may be expressed by the following equation:

$$r=\sqrt{x^2+y^2}$$

Additionally, a point in the xy-plane (of FIG. 6A) may have an angular coordinate that may be an angle between a line extending orthogonally from the rotational axis of drill bit 601 to the point and the x-axis. For example, the angular coordinate ($\theta$) of a point in the xy-plane (of FIG. 6B) having an x-coordinate, x, and a y-coordinate, y, may be expressed by the following equation:

$$\theta=\arctan(y/x)$$

As a further example, as illustrated in FIG. 6A, cutlet point 630a (described in further detail below) associated with a cutting edge of first-layer cutting element 628a may have an x-coordinate ($X_{630a}$) and a y-coordinate ($Y_{630a}$) in the xy-plane. $X_{630a}$ and $Y_{630a}$ may be used to calculate a radial coordinate ($R_F$) of cutlet point 630a (e.g., $R_F$ may be equal to the square root of $X_{630a}$ squared plus $Y_{630a}$ squared). $R_F$ may accordingly indicate an orthogonal distance of cutlet point 630a from the rotational axis of drill bit 601.

Additionally, cutlet point 630a may have an angular coordinate ($\theta_{630a}$) that may be the angle between the x-axis and the line extending orthogonally from the rotational axis of drill bit 601 to cutlet point 630a (e.g., $\theta_{630a}$ may be equal to arctan ($X_{630a}/Y_{630a}$)). Further, as depicted in FIG. 6B, cutlet point 630a may have an axial coordinate ($Z_{630a}$) that may represent a position of cutlet point 630a along the rotational axis of drill bit 601.

The cited coordinates and coordinate systems are used for illustrative purposes only, and any other suitable coordinate system or configuration, may be used to provide a frame of reference of points along the bit face profile and bit face of a drill bit associated with FIGS. 6A and 6B, without departing from the scope of the present disclosure. Additionally, any suitable units may be used. For example, the angular position may be expressed in degrees or in radians.

Returning to FIG. 6A, drill bit 601 may include a plurality of blades 626 that may include cutting elements 628. In the illustrated embodiment, blades 626 of drill bit 601 may be divided into groups including primary blades 626a, 626c, and 626e and secondary blades 626b, 626d, and 626f. First-layer cutting elements 628a, 628c, and 628e may be placed on primary blades 626a, 626c, and 626e and corresponding second-layer cutting elements 628b, 628d, and 628f may be placed on secondary blades 626b, 626d, and 626f. Corresponding second-layer cutting elements 628b, 628d, and 628f may be track set with corresponding first-layer cutting elements 628a, 628c, and 628e, e.g., placed in the same radial position from bit rotational axis.

In the illustrated embodiment, drill bit 601 is designed with an opposite track set configuration similar to the configuration shown in FIG. 5A. For example, second-layer cutting element 628b may be track set with first-layer cutting element 628e, second-layer cutting element 628d may be track set with first-layer cutting element 628a, and likewise, second-layer cutting element 628f may be track set with first layer cutting element 628c. In other embodiments, the angular positions of second-layer cutting elements 628b, 628d, and 628f may be such that second-layer cutting elements 628b, 628d, and 628f are placed in front of (with respect to the rotational direction of drill bit 601) the cutting zones of first-layer cutting elements 628a, 628c, and 628e, respectively, such that drill bit 601 is designed with a front track set configuration similar to that shown in FIG. 4A.

As mentioned above, the critical depth of cut of drill bit 601 provided by second-layer cutting elements 628b, 628d, and 628f may be determined for a radial location along drill bit 601. For example, drill bit 601 may include a radial coordinate $R_F$ that may intersect with the cutting edge of second-layer cutting elements 628b, 628d, and 628f at control points $P_{640b}$, $P_{640d}$, and $P_{640f}$, respectively. Likewise, radial coordinate $R_F$ may intersect with the cutting edge of first-layer cutting elements 628a, 628c, and 628e at cutlet points 630a, 630c, and 630e, respectively.

The angular coordinates of cutlet points 630a, 630c, and 630e ($\theta_{630a}$, $\theta_{630c}$, and $\theta_{630e}$, respectively) and control points $P_{640b}$, $P_{640d}$, and $P_{640f}$ ($\theta_{P640b}$, $\theta_{P640d}$, and $\theta_{P640f}$, respectively) may be determined. A depth of cut control provided by each of control points $P_{640b}$, $P_{640d}$, and $P_{640f}$ with respect to each of cutlet points 630a, 630c, and 630e may be determined. The depth of cut control provided by each of control points $P_{640b}$, $P_{640d}$, and $P_{640f}$ may be based on the underexposure ($\delta_{650i}$ depicted in FIG. 6B) of each of control points $P_{640b}$, $P_{640d}$, and $P_{640f}$ with respect to each of cutlet points 630a, 630c, and 630e and the angular coordinates of control points $P_{640b}$, $P_{640d}$, and $P_{640f}$ with respect to cutlet points 630a, 630c, and 630e.

For example, the depth of cut of first-layer cutting element 628e at cutlet point 630e controlled by second-layer cutting element 628b at control point $P_{640b}$ ($\Delta_{630e}$) may be determined using the angular coordinates of cutlet point 630e and control point $P_{640b}$ ($\theta_{630e}$ and $\theta_{P640b}$, respectively), which are depicted in FIG. 6A. Additionally, $\Delta_{630e}$ may be based on the axial underexposure ($\delta_{650e}$) of the axial coordinate of control point $P_{640b}$ ($Z_{P640b}$) with respect to the axial coordinate of cutlet point 630e ($Z_{630e}$), as depicted in FIG. 6B. In some embodiments, $\delta_{630e}$ may be determined using the following equations:

$$\Delta_{630e} = \delta_{650e} * 360/(360 - (\theta_{P640b} - \theta_{630e})); \text{ and}$$

$$\delta_{650e} = Z_{630e} - Z_{P640b}.$$

In the first of the above equations, $\theta_{P640b}$ and $\theta_{630e}$ may be expressed in degrees and "360" may represent a full rotation about the face of drill bit 601. Therefore, in instances where $\theta_{P640b}$ and $\theta_{630e}$ are expressed in radians, the numbers "360" in the first of the above equations may be changed to "$2\pi$." Further, in the above equation, the resultant angle of "($\theta_{P640b}$ and $\theta_{630e}$)" ($\Delta_\theta$) may be defined as always being positive. Therefore, if resultant angle $\Delta_\theta$ is negative, then $\Delta_\theta$ may be made positive by adding 360 degrees (or $2\pi$ radians) to $\Delta_\theta$. Similar equations may be used to determine the depth of cut of first-layer cutting elements 628a and 628c as controlled by control point $P_{640b}$ at cutlet points 630a and 630c, respectively ($\Delta_{630a}$ and $\Delta_{630c}$, respectively).

The critical depth of cut provided by control point $P_{640b}$ ($\Delta_{P640b}$) may be the maximum of $\Delta_{630a}$, $\Delta_{630c}$, and $\Delta_{630e}$ and may be expressed by the following equation:

$$\Delta_{P640b} = \max[\Delta_{630a}, \Delta_{630c}, \Delta_{630e}].$$

The critical depth of cut provided by control points $P_{640d}$ and $P_{640f}$ ($\Delta_{P640d}$ and $\Delta_{P640f}$, respectively) at radial coordinate $R_F$ may be similarly determined. The overall critical depth of cut of drill bit 601 at radial coordinate $R_F$ ($\Delta_{RF}$) may be based on the minimum of $\Delta_{P640b}$, $\Delta_{P640d}$, and $\Delta_{P640f}$ and may be expressed by the following equation:

$$\Delta_{RF} = \min[\Delta_{P640b}, \Delta_{P640d}, \Delta_{P640f}].$$

Accordingly, the overall critical depth of cut of drill bit 601 at radial coordinate $R_F$ ($\Delta_{RF}$) may be determined based on the points where first-layer and second-layer cutting elements 628 intersect $R_F$. Although not expressly shown here, it is understood that the overall critical depth of cut of drill bit 601 at radial coordinate $R_F$ ($\Delta_{RF}$) may also be affected by control points $P_{626i}$ (not expressly shown in FIGS. 6A and 6B) that may be associated with blades 626 configured to control the depth of cut of drill bit 601 at radial coordinate $R_F$. In such instances, a critical depth of cut provided by each control point $P_{626i}$ ($\Delta_{P626i}$) may be determined. Each critical depth of cut $\Delta_{P626i}$ for each control point $P_{626i}$ may be included with critical depth of cuts $\Delta_{P626i}$ in determining the minimum critical depth of cut at $R_F$ to calculate the overall critical depth of cut $\Delta_{RF}$ at radial location $R_F$.

To determine a critical depth of cut control curve of drill bit 601, the overall critical depth of cut at a series of radial locations $R_f$ ($\Delta_{Rf}$) anywhere from the center of drill bit 601 to the edge of drill bit 601 may be determined to generate a curve that represents the critical depth of cut as a function of the radius of drill bit 601. In the illustrated embodiment, second-layer cutting elements 628b, 628d, and 628f may be configured to control the depth of cut of drill bit 601 for a radial swath 608 (shown on FIG. 6A) defined as being located between a first radial coordinate $R_A$ and a second radial coordinate $R_B$. Accordingly, the overall critical depth of cut may be determined for a series of radial coordinates $R_f$ that are within radial swath 608 and located between $R_A$ and $R_B$, as disclosed above. Once the overall critical depths of cuts for a sufficient number of radial coordinates $R_f$ are determined, the overall critical depth of cut may be graphed as a function of the radial coordinates $R_f$ as a critical depth of cut control curve (CDCCC).

Modifications, additions or omissions may be made to FIGS. 6A and 6B without departing from the scope of the present disclosure. For example, as discussed above, blades 626, cutting elements 628, DOCCs (not expressly shown) or any combination thereof may affect the critical depth of cut at one or more radial coordinates and the CDCCC may be determined accordingly. Additionally, a CDCCC may be similarly used to determine a desired axial position of a back up cutting element. Further, the above description of the CDCCC calculation may be used to determine a CDCCC of any suitable drill bit.

Figure 7:
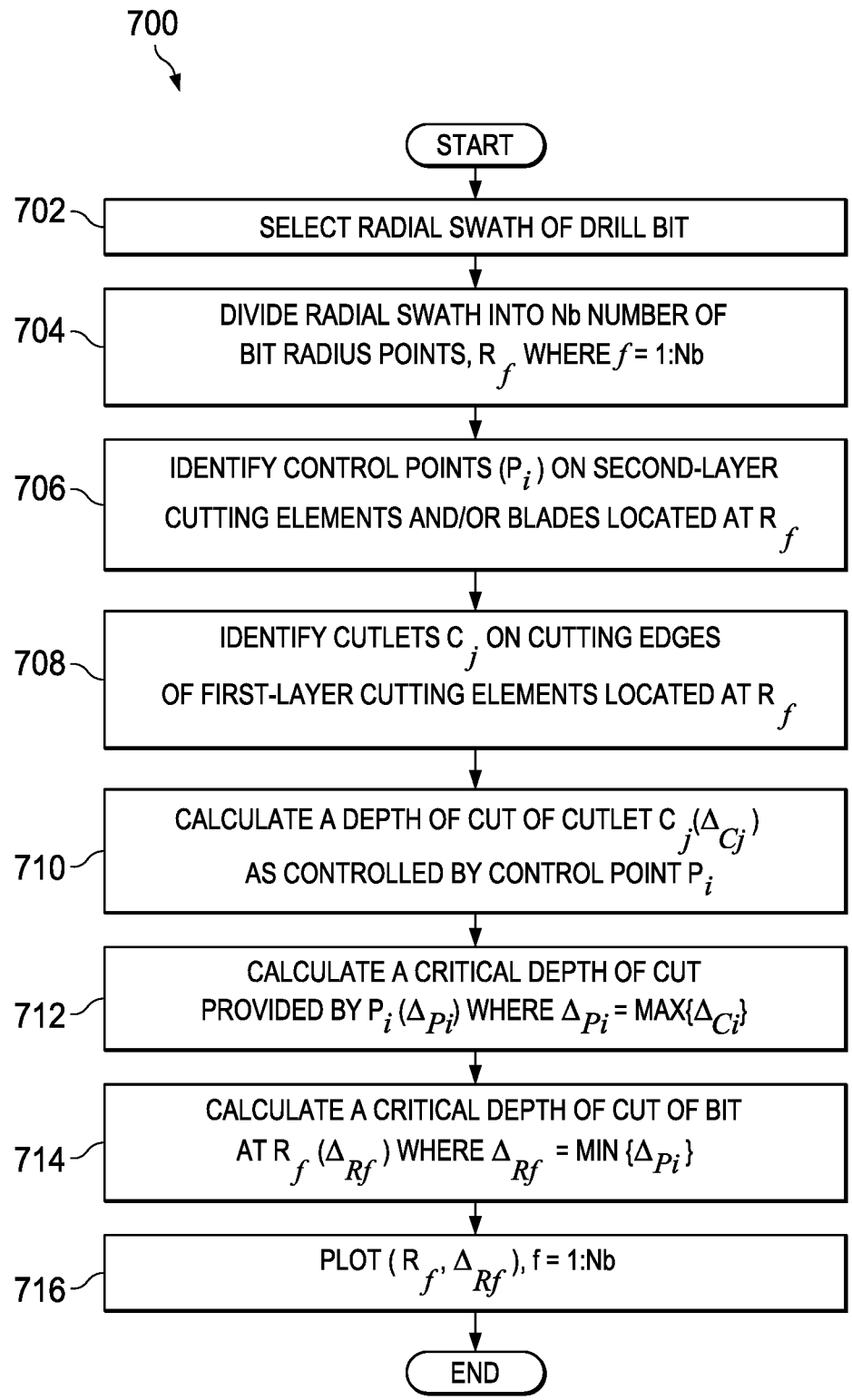
FIG. 7 illustrates an example method of determining and generating a critical depth of cut control curve, in accordance with some embodiments of the present disclosure.

FIG. 7 illustrates an example method 700 of determining and generating a CDCCC in accordance with some embodiments of the present disclosure. The steps of method 700 may be performed by various computer programs, models or any combination thereof, configured to simulate and design drilling systems, apparatuses and devices. The programs and models may include instructions stored on a computer readable medium and operable to perform, when executed, one or more of the steps described below. The computer readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer readable media. Collectively, the computer programs and models used to simulate and design drilling systems may be referred to as a "drilling engineering tool" or "engineering tool."

In the illustrated embodiment, the cutting structures of the drill bit, including at least the locations and orientations of all first-layer cutting elements and DOCCs, may have been previously designed. However in other embodiments, method 700 may include steps for designing the cutting structure of the drill bit. For illustrative purposes, method 700 is described with respect to drill bit 601 of FIGS. 6A and 6B; however, method 700 may be used to determine the CDCCC of any suitable drill bit.

Method 700 may start, and at step 702, the engineering tool may select a radial swath of drill bit 601 for analyzing the critical depth of cut within the selected radial swath. In some instances the selected radial swath may include the entire face of drill bit 601 and in other instances the selected radial swath may be a portion of the face of drill bit 601. For example, the engineering tool may select radial swath 608 as defined between radial coordinates $R_A$ and $R_B$ and controlled by second-layer cutting elements 628b, 628d and 628f, shown in FIGS. 6A and 6B.

At step 704, the engineering tool may divide the selected radial swath (e.g., radial swath 608) into a number, Nb, of radial coordinates ($R_f$) such as radial coordinate $R_F$ described in FIGS. 6A and 6B. For example, radial swath 608 may be divided into nine radial coordinates such that Nb for radial swath 608 may be equal to nine. The variable "f" may represent a number from one to Nb for each radial coordinate within the radial swath. For example, "$R_1$" may represent the radial coordinate of the inside edge of a radial swath. Accordingly, for radial swath 608, "$R_1$" may be approximately equal to $R_A$. As a further example, "$R_{Nb}$" may represent the radial coordinate of the outside edge of a radial swath. Therefore, for radial swath 608, "$R_{Nb}$" may be approximately equal to $R_B$.

At step 706, the engineering tool may select a radial coordinate $R_f$ and may identify control points ($P_i$) located at the selected radial coordinate $R_f$ and associated with a DOCC, a cutting element, and/or a blade. For example, the engineering tool may select radial coordinate $R_F$ and may identify control points $P_{640b}$, $P_{640d}$, and $P_{640f}$ associated with blades 626 and/or second-layer cutting elements 628b, 628d, and 628f and located at radial coordinate $R_F$, as described above with respect to FIGS. 6A and 6B.

At step 708, for the radial coordinate $R_f$ selected in step 706, the engineering tool may identify cutlet points ($C_j$) each located at the selected radial coordinate $R_f$ and associated with the cutting edges of cutting elements. For example, the engineering tool may identify cutlet points 630a, 630c, and 630e located at radial coordinate $R_F$ and associated with the cutting edges of first-layer cutting elements 628a, 628c, and 629e as described and shown with respect to FIGS. 6A and 6B.

At step 710 the engineering tool may select a control point $P_i$ and may calculate a depth of cut for each cutlet $C_j$ as controlled by the selected control point $P_i$ ($\Delta_{C_j}$). For example, the engineering tool may determine the depth of cut of cutlet points 630a, 630c, and 630e as controlled by control point $P_{640b}$ ($\Delta_{630a}$, $\Delta_{630c}$, and $\Delta_{630e}$, respectively) by using the following equations:

$$\Delta_{630a} = \delta_{650a} * 360/(360-(\theta_{P640b}-\theta_{630a}));$$

$$\delta_{650a} = Z_{630a} - Z_{P640b};$$

$$\Delta_{630c} = \delta_{650c} * 360/(360-(\theta_{P640b}-\theta_{630c}));$$

$$\delta_{650c} = Z_{630c} - Z_{P640b};$$

$$\Delta_{630e} = \delta_{650e} * 360/(360-(\theta_{P640b}-\theta_{630e})); \text{ and}$$

$$\delta_{650e} = Z_{630e} - Z_{P640b}.$$

At step 712, the engineering tool may calculate the critical depth of cut provided by the selected control point ($\Delta_{P_i}$) by determining the maximum value of the depths of cut of the cutlets $C_j$ as controlled by the selected control point $P_i$ ($\Delta_{C_j}$) and calculated in step 710. This determination may be expressed by the following equation:

$$\Delta_{P_i} = \max\{\Delta_{C_j}\}.$$

For example, control point $P_{640b}$ may be selected in step 710 and the depths of cut for cutlets 630a, 630c, and 630e as controlled by control point $P_{640b}$ ($\Delta_{630a}$, $\Delta_{630c}$, and $\Delta_{630e}$, respectively) may also be determined in step 710, as shown above. Accordingly, the critical depth of cut provided by control point $P_{640b}$ ($\Delta_{P640b}$) may be calculated at step 712 using the following equation:

$$\Delta_{P640b} = \max[\Delta_{630a}, \Delta_{630c}, \Delta_{630e}].$$

The engineering tool may repeat steps 710 and 712 for all of the control points $P_i$ identified in step 706 to determine the critical depth of cut provided by all control points $P_i$ located at radial coordinate $R_f$. For example, the engineering tool may perform steps 710 and 712 with respect to control points $P_{640d}$ and $P_{640f}$ to determine the critical depth of cut provided by control points $P_{640d}$ and $P_{640f}$ with respect to cutlets 630a, 630c, and 630e at radial coordinate $R_F$ shown in FIGS. 6A and 6B.

At step 714, the engineering tool may calculate an overall critical depth of cut at the radial coordinate $R_f$ ($\Delta_{Rf}$) selected in step 706. The engineering tool may calculate the overall critical depth of cut at the selected radial coordinate $R_f$ ($\Delta_{Rf}$) by determining a minimum value of the critical depths of cut of control points $P_i$ ($\Delta_{P_i}$) determined in steps 710 and 712. This determination may be expressed by the following equation:

$$\Delta_{Rf} = \min\{\Delta_{P_i}\}.$$

For example, the engineering tool may determine the overall critical depth of cut at radial coordinate $R_F$ of FIGS. 6A and 6B by using the following equation:

$$\Delta_{RF} = \min[\Delta_{P640b}, \Delta_{P640d}, \Delta_{P640f}].$$

The engineering tool may repeat steps 706 through 714 to determine the overall critical depth of cut at all the radial coordinates $R_f$ generated at step 704.

Figure 8:
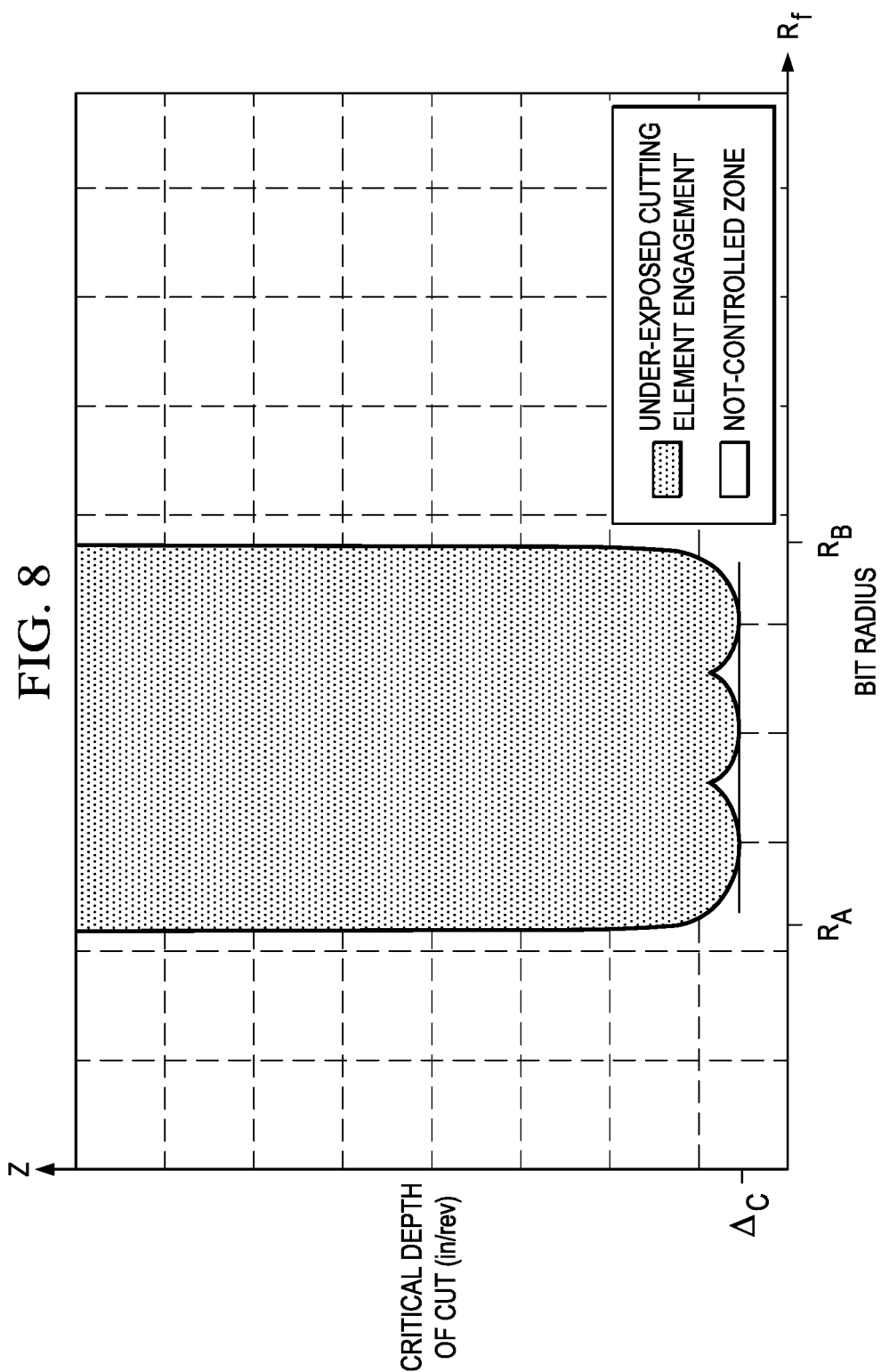
FIG. 8 illustrates a critical depth of cut curve where the critical depth of cut is plotted as a function of the bit radius, in accordance with some embodiments of the present disclosure.

At step 716, the engineering tool may plot the overall critical depth of cut ($\Delta_{Rf}$) for each radial coordinate $R_f$, as a function of each radial coordinate $R_f$. Accordingly, a critical depth of cut control curve may be calculated and plotted for the radial swath associated with the radial coordinates $R_f$. For example, the engineering tool may plot the overall critical depth of cut for each radial coordinate $R_f$ located within radial swath 608, such that the critical depth of cut control curve for swath 608 may be determined and plotted, as depicted in FIG. 8. Following step 716, method 700 may end. Accordingly, method 700 may be used to calculate and plot a critical depth of cut control curve of a drill bit. The critical depth of cut control curve may be used to determine whether the drill bit provides a substantially even control of the depth of cut of the drill bit. Therefore, the critical depth of cut control curve may be used to modify the DOCCs, second-layer cutting elements, and/or blades of the drill bit configured to control the depth of cut of the drill bit.

Modifications, additions, or omissions may be made to method 700 without departing from the scope of the present disclosure. For example, the order of the steps may be performed in a different manner than that described and some steps may be performed at the same time. Additionally, each individual step may include additional steps without departing from the scope of the present disclosure.

FIG. 8 illustrates a critical depth of cut control curve (CDCCC) where the critical depth of cut is plotted as a function of the bit radius, in accordance with some embodiments of the present disclosure. As mentioned above, the critical depth of cut control curve may be used to determine the minimum critical depth of cut control as provided by the DOCCS, second-layer cutting elements and/or blades of a drill bit. For example, FIG. 8 illustrates a critical depth of cut control curve for drill bit 601 between radial coordinates $R_A$ and $R_B$. In the illustrated embodiment of FIG. 6A, drill bit 601 may have first radial coordinate $R_A$ of approximately 2.5 inches and second radial coordinate $R_B$ of approximately 4.5 inches and thus, the radial swath 608 is located between approximately 2.5 inches and 4.5 inches. The z-axis in FIG. 8 may represent the rotational axis of drill bit 601, and the radial (R) axis may represent the radial distance from the rotational axis of drill bit 601.

Using method 700 illustrated in FIG. 7, simulations may be run utilizing an exemplary opposite track set drill bit (e.g., drill bit 501 of FIG. 5A) while varying the under-exposure $\delta_i$ of second-layer cutting elements (e.g. second-layer cutting elements 128b of FIG. 5A) with respect to first-layer cutting elements (e.g., first-layer cutting elements 128a of FIG. 5A). In one simulation at an RPM of approximately 120, under-exposure $\delta_{128}$ may be set at approximately 0.030 inches for all second-layer cutting elements. Using this configuration and after generating the resultant CDCCC (e.g., step 716 from FIG. 7), the minimum critical depth of cut per revolution (CDOC) ($\Delta_c$) may be approximately 0.05342 inches/rev. As noted above, the depth of cut per revolution ($\Delta$) may be calculated using the equation:

$$\Delta = ROP/(5*RPM) \text{ (in/rev)}$$

and, ROP may be calculated for any CDOC ($\Delta_c$) as:

$$ROP = \Delta_c * 5 * RPM \text{ (ft/hr)}.$$

Thus, critical ROP for the current example may be approximately 32 ft/hr. In other words, when the rate of penetration (ROP) of drill bit 501 is below approximately 32 ft/hr, only first-layer cutting elements 128a may engage the formation. Second-layer cutting elements 128b may begin to engage the formation only when drill bit 501 has ROP greater than approximately 32 ft/hr.

In another simulation at an RPM of approximately 120, under-exposure $\delta_{128}$ may be set at approximately 0.045 inches for all second-layer cutting elements 128b. Using this configuration and after generating the resultant CDCCC (e.g., step 716 from FIG. 7), the minimum critical depth of cut per revolution (CDOC) ($\Delta_c$) may be approximately 0.0789 inches/rev. Thus, critical ROP for the current example may be approximately 47.3 ft/hr. In other words, when the rate of penetration (ROP) of drill bit 501 is below approximately 47.3 ft/hr, only first-layer cutting elements 128a may engage the formation. Second-layer cutting elements 128b may begin to engage the formation only when drill bit 501 has an ROP greater than approximately 47.3 ft/hr.

Additionally, cutting element engagement analysis may assist further in determining appropriate under-exposure for second-layer cutting elements 128b on a drill bit (e.g., drill bit 101 of FIGS. 1 and 2, drill bit 401 of FIG. 4A, drill bit 501 of FIG. 5A and drill bit 601 of FIG. 6A). Cutting element engagement analysis may simulate operation of drill bits 101, 401, 501 and 601 during directional and horizontal drilling at a set ROP and RPM in order to provide the engagement of the different cutting elements with the formation. For example, drill bit 501 may be configured as opposite track set (e.g. FIG. 5A) a particular number of first-layer cutting elements 128a placed on primary blades (1, 3, 5) and a particular number of second-layer cutting elements 128b track set with corresponding first-layer cutting elements 128a and placed on secondary blades (2, 4, 6).

Following simulation, the resulting plot defines the cutting area (in²) as a function of cutting element number.

Figure 9:
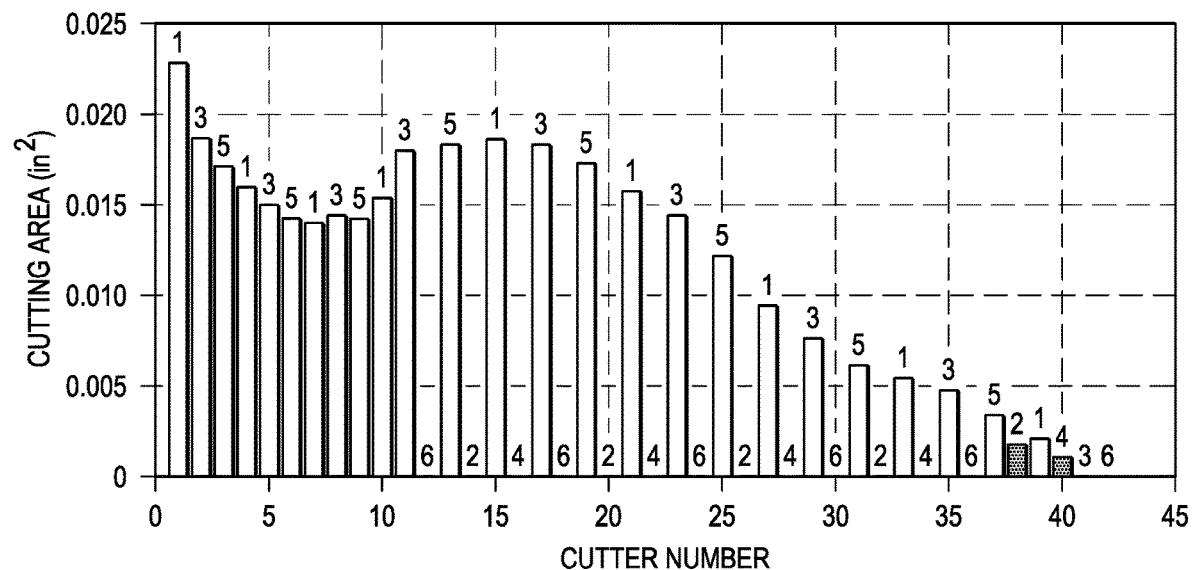
FIG. 9 illustrates a graph showing cutting area of individual cutters of a drill bit designed in accordance with some embodiments of the present disclosure during sliding mode drilling.

FIG. 9 illustrates graph 900 showing cutting area of individual cutters of a drill bit during sliding mode drilling designed in accordance with some embodiments of the present disclosure. The illustrated embodiment resulted from a simulation using an exemplary opposite track set configuration drill bit (similar in configuration to drill bit 501 of FIG. 5A) with an ROP of approximately 40 ft/hr (corresponding to Zone A in FIG. 5B), at an RPM of approximately 120, and an under-exposure of second-layer cutting elements 128b of approximately 0.045 inches. As discussed with respect to FIG. 8, the critical depth of cut (CDOC) for this configuration is approximately 0.0789 in/rev. As noted above, the depth of cut per revolution ($\Delta$) may be calculated using the equation:

$$\Delta = ROP/(5*RPM).$$

Thus, at a ROP of 40 ft/hr, depth of cut per revolution ($\Delta$) is approximately 0.0667 in/rev, which is lower than the CDOC of 0.0789 in/rev. This indicates that second-layer cutting elements 128b may not cut into the formation. As shown in FIG. 9, only second-layer cutting elements 38 and 40 may have contacted the formation. Thus, the cutting element engagement analysis shown in FIG. 9 confirms that second-layer cutting elements 128b may not cut the formation in Zone A. Therefore, where low WOB is available (e.g., Zone A in FIG. 5B), a drill bit configured as opposite track set (similar to drill bit 501 in FIGURE) may drill very efficiently.

Figure 10:
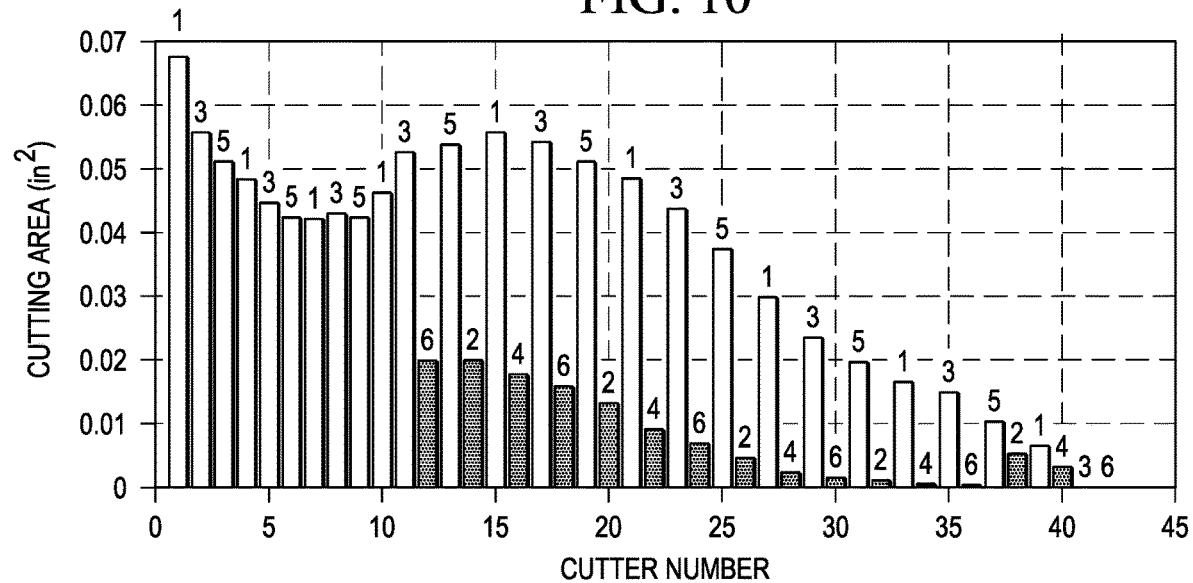
FIG. 10 illustrates a graph showing cutting area of individual cutters of a drill bit designed in accordance with some embodiments of the present disclosure during rotating mode drilling.

Likewise, FIG. 10 illustrates a graph 1000 showing cutting area of individual cutters of a drill bit rotating mode drilling designed in accordance with some embodiments of the present disclosure. The illustrated embodiment resulted from a simulation with ROP approximately 120 ft/hr, which is in Zone C from FIG. 5B, at an RPM of approximately 120, and an under-exposure of second-layer cutting elements 128b of approximately 0.045 inches. As discussed with respect to FIG. 8, the critical depth of cut for this configuration is approximately 0.0789 in/rev. As noted above, the depth of cut per revolution ($\Delta$) at a ROP of 120 ft/hr can be calculated and is approximately 0.2 in/rev, which is greater than the CDOC of 0.0789 in/rev. This indicates that second-layer cutting elements 128b may cut into the formation. As shown in the resultant plot from simulation in FIG. 10, second-layer cutting elements 128b beginning with cutting element 10 through cutting element 40 contacted the formation. Thus, the cutting element engagement analysis shown in FIG. 10 confirms that second-layer cutting elements 128b may cut the formation in Zone C (shown in FIG. 5B). Therefore, where high WOB is available (e.g., Zone C), drill bit 501 may drill very efficiently.

Figure 11:
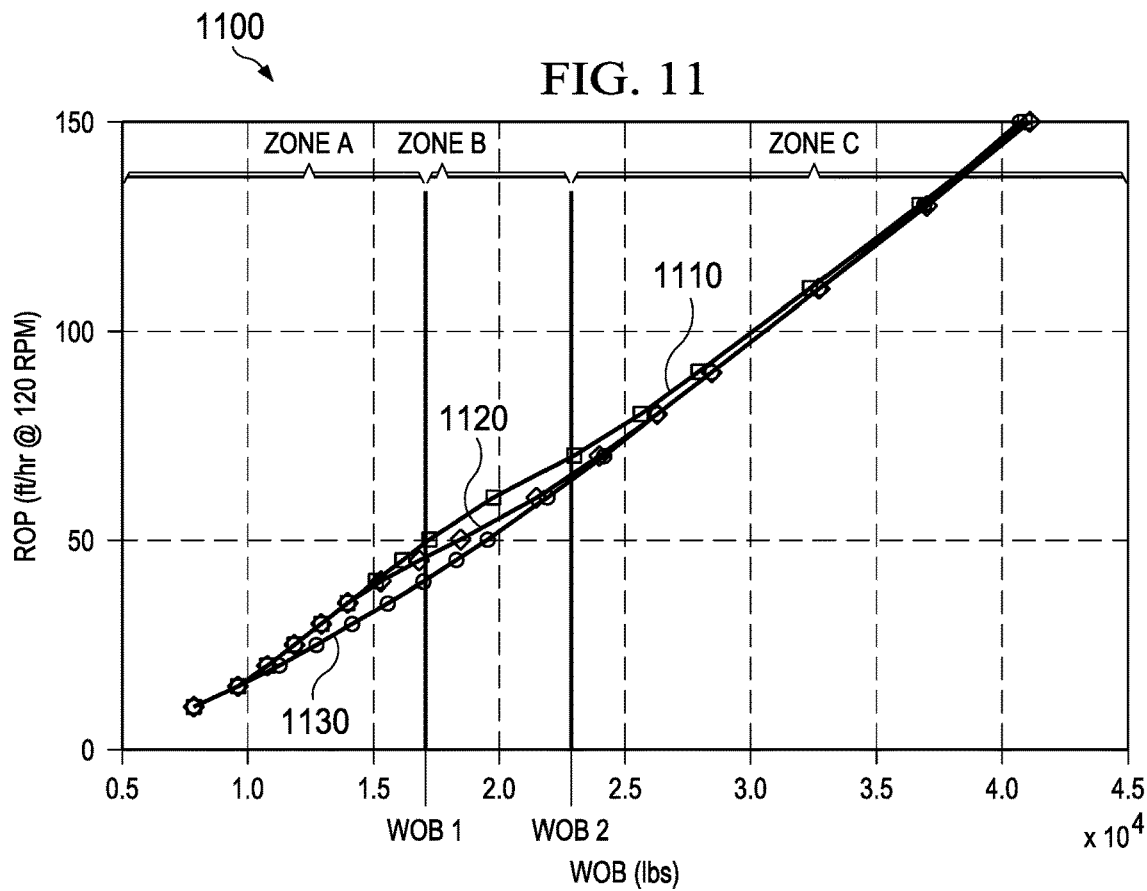
FIG. 11 illustrates a graph of the rate of penetration and weight on bit relationship of drill bits with second-layer cutting elements at varied under-exposures to first-layer cutting elements designed in accordance with some embodiments of the present disclosure.

FIG. 11 illustrates a graph 1100 of the rate of penetration and weight on bit relationship of drill bits with second-layer cutting elements at varied under-exposures to first-layer cutting elements designed in accordance with some embodiments of the present disclosure. Thus, FIG. 11 illustrates the effect of different amounts of under-exposure on the ROP and WOB relationship. Graph 1100 is based on a simulation at rotation rate of approximately 120 RPM, a formation with an unconfined rock strength of approximately 18,000 psi, drill bit size of approximately 9.875 inches, and an exemplary opposite track set drill bit, such as drill bit 501 of FIG. 5A, with first-layer cutting elements 128a and second-layer cutting elements 128b. Two under-exposures were simulated for second-layer cutting elements 128b: 0.03 inches, shown in plot 1120, and 0.045 inches, shown in plot 1110. Additionally, plot 1130 corresponds with results from a simulation utilizing a conventional single set drill bit. As can be seen from the results, the higher under-exposure may experience a higher ROP and therefore, depth of cut per revolution A.

Figure 12:
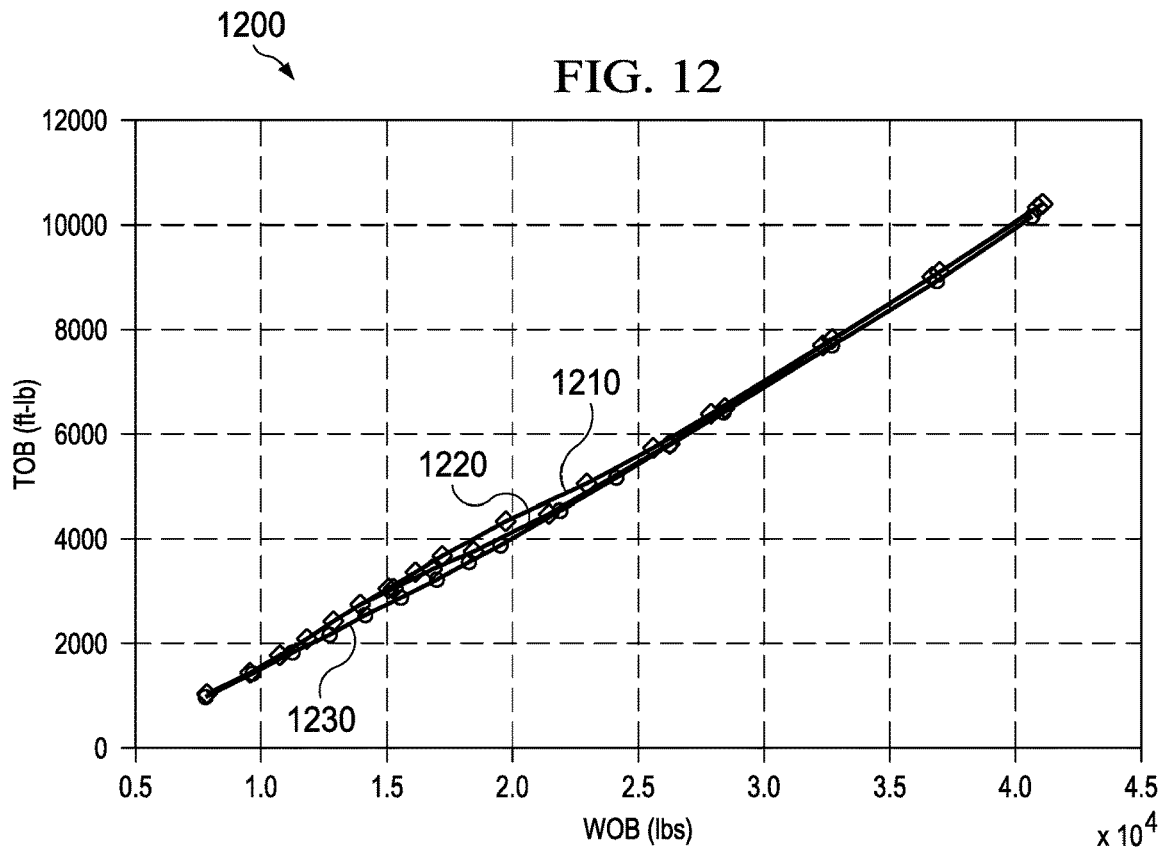
FIG. 12 illustrates a graph representing the torque on bit and weight on bit relationship of drill bits with second-layer cutting elements at varied under-exposures to first-layer cutting elements designed in accordance with some embodiments of the present disclosure.

FIG. 12 illustrates graph 1200 representing the torque on bit and weight on bit relationship for second-layer cutting elements at varied under-exposures to first-layer cutting elements on drill bits designed in accordance with some embodiments of the present disclosure. Thus, FIG. 12 illustrates the bit drilling efficiency of the different levels of under-exposure in the same drill bit configuration utilized in FIG. 11. For example, plot 1210 corresponds to an under-exposure of 0.045 inches similar to plot 1110 from FIG. 11. Likewise, plot 1220 corresponds to an under-exposure of 0.03 inches similar to plot 1120 from FIG. 11. Additionally, plot 1230 corresponds with results from a simulation utilizing a conventional single set drill bit. Bit drilling efficiency may be shown by a comparison of TOB to WOB. As can be seen from the graph, a larger under-exposure may result in a higher TOB at any particular WOB, and thus, a higher drilling efficiency.

Turning briefly to FIG. 8, under-exposure of each of second-layer cutting elements may be so designed that the critical depth of cut provided by each of second-layer cutting elements may be substantially the same as shown in FIG. 8. In other words, all second-layer cutting elements may engage the formation at approximately the same ROP at a given RPM.

Figure 13:
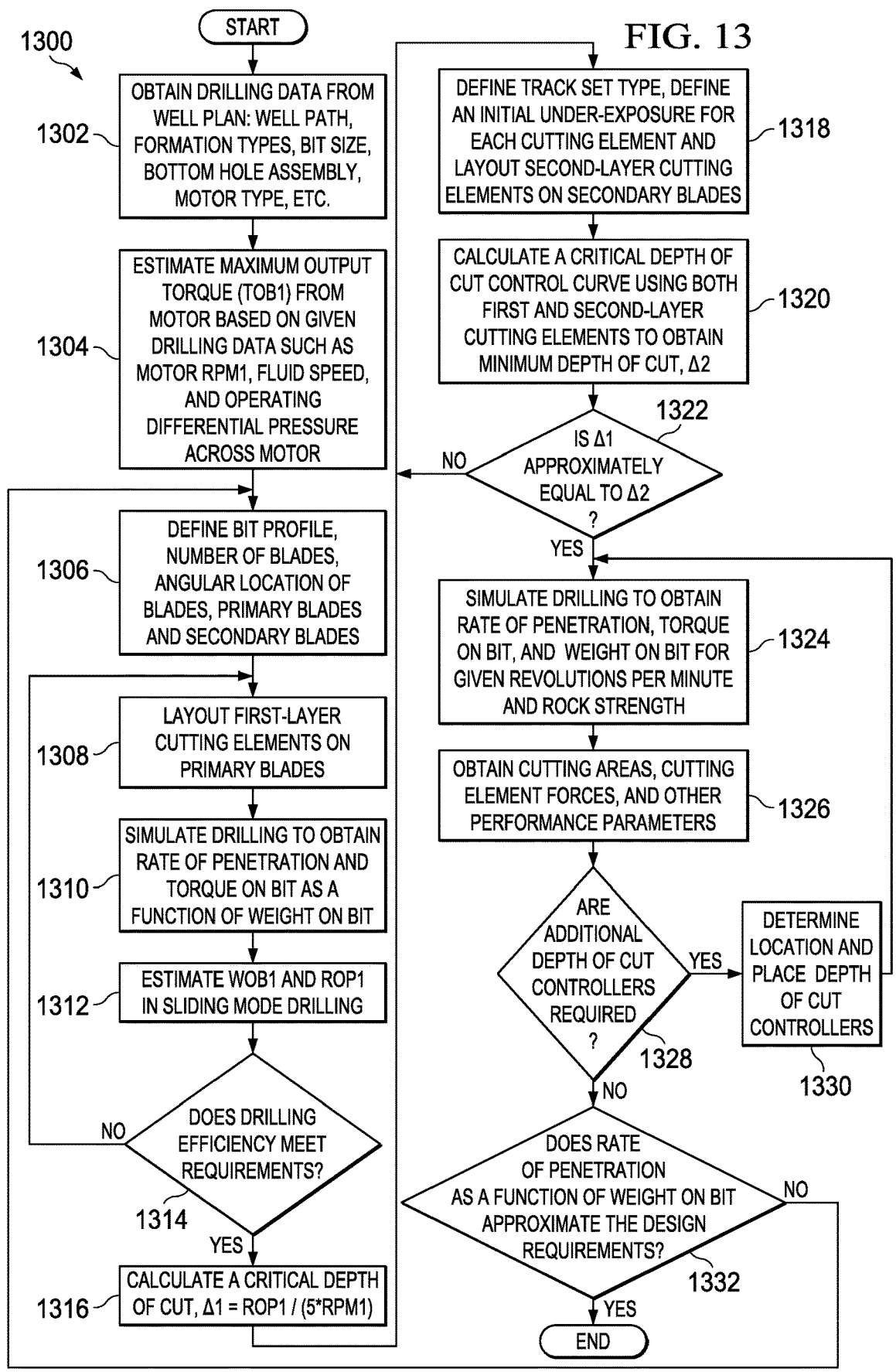
FIG. 13 illustrates a flow chart for designing a multi-profile layer drill bit to provide directional and horizontal drilling, in accordance with some embodiments of the present disclosure.

FIG. 13 illustrates a flow chart for designing a multi-layer drill bit (e.g., drill bit 101 of FIGS. 1 and 2, drill bit 401 of FIG. 4A, drill bit 501 of FIG. 5A and drill bit 601 of FIG. 6A) to provide directional and horizontal drilling in accordance with embodiments of the present disclosure. The steps of method 1300 may be performed by various computer programs, models or any combination thereof, configured to simulate and design drilling systems, apparatuses and devices. The programs and models may include instruction stored on a computer readable medium and operable to perform, when expected, one of more of the steps described below. The computer readable media may include any system, apparatus, or device configured to store and retrieve programs or instructions such as a hard disk drive, a compact disc, flash memory or any other suitable device. The programs and models may be configured to direct a processor or other suitable unit to retrieve and execute the instructions from the computer readable media. Collectively, the computer programs and models used to simulate and design drilling systems may be referred to as a "drilling engineering tool" or "engineering tool."

In the illustrated embodiment, the cutting structures of a drill bit, including at least the location and orientation of all cutting elements and any DOCCs, may have been previously designed. However, in other embodiments, method 1300 may include steps for designing the cutting structure of a drill bit. For illustrative purposes, method 1300 is described with respect to drill bit 501 of FIG. 5A; however, method 1300 may be used to determine the appropriate layout for directional and horizontal drilling of any suitable drill bit, including drill bit 101 of FIGS. 1 and 2, drill bit 401 of FIG. 4A and drill bit 601 of FIG. 6A.

Method 1300 may start, and at step 1302, the engineering tool may obtain drilling data from a well plan, including well path, kickoff location, DLS, formation type, hole size, BHA dimension, downhole motor, and/or other characteristics. At step 1304, the engineering tool may estimate the motor operational data from the motor technical specification provided by the motor manufacturer (e.g., the motor data as illustrated in FIG. 2B). Aspects estimated may include maximum operational load, differential pressure across the motor, fluid speed, and maximum output torque (TOB1) at motor rotational speed, RPM1. For example, FIG. 2B illustrates motor characteristics of an exemplary downhole motor manufactured by Sperry Drilling Services at Halliburton Company. As shown in FIG. 2B, at a differential pressure of approximately 470 psi and a fluid speed of approximately 450 GPM, TOB1 may be approximately 4,000 ft-lb at RPM1 of approximately 130 RPM.

At step 1306, the engineering tool may determine the drill bit size and the number of blades for drill bit 501 for drilling in sliding mode drilling and rotating mode drilling. In some instances, the number of blades may be based on the type of formation to be cut, BHA 120 that may be used, and/or directional data for the formation to be cut, such as kickoff location, radius to be cut, and direction that drill bit 501 will drill into the formation. In one embodiment, the engineering tool may define blades 126 as primary blades (1, 3, 5) and secondary blades (2, 4, 6). The engineering tool may then determine angular positions of each blade 126. In some instances, determination of angular location of blades 126 may depend on the number and type of blades 126 among other features. The designation of primary blades (1, 3, 5) and secondary blades (2, 4, 6) may also depend on the total number of blades, corresponding angular locations, and other factors.

At step 1308, the engineering tool may generate a preliminary layout for first-layer cutting elements 128a on primary blades (1, 3, 5) using predetermined cutter density, back rake, side rake and other geometry. With this preliminary information, at step 1310, the engineering tool may run multiple drilling simulations for drill bit 501 with the determined layout for first-layer cutting elements 128a. As part of the drilling simulations and using at least bit motor rotational speed RPM1 and formation strength, the engineering tool may generate a plot of ROP as a function of WOB and a plot of TOB as a function of WOB. The formation strength may be estimated based on testing or other similar drilling operations. For example, FIG. 11 illustrates graph 1100 of ROP as a function of WOB for a drill bit similar to drill bit 501 shown in FIG. 5A. FIG. 12 illustrates an example graph 1200 of TOB as a function of WOB for a drill bit similar to drill bit 501 shown in FIG. 5A.

At step 1312, the engineering tool may estimate WOB1, which is the point at which second-layer cutting elements 128b may begin to cut into the formation. First, WOB1 at TOB1 (identified in step 1304) may be determined from the plot of TOB as a function of WOB as illustrated in FIG. 12. Then, ROP1 at WOB1 may be defined based on the determined WOB1 and the plot of ROP as a function of WOB as illustrated in FIG. 11.

At step 1314, the engineering tool may determine if the layout of first-layer cutting elements 128a achieves the desired design requirements for drill bit 501. The design requirements may include, but are not limited to, force balance condition and cutter force distribution. The design requirements may also include the slope of ROP as a function of WOB under given drilling conditions. If drill bit 501 does not meet the desired design requirements, step 1308 to step 1312 may be repeated by adjusting the location, density, back rake, side rake, and other characteristics of first-layer cutting elements 128a.

Once the layout of first-layer cutting elements 128a is determined to meet the desired design requirements, the engineering tool may calculate a critical depth of cut, $\Delta 1$, using the RPM1 and ROP1 at step 1316. Critical depth of cut of second-layer cutting elements 128*b* may be a function of the under exposure of second-layer cutting elements 128*b* with respect to first-layer cutting elements 128*a*. Critical depth of cut, Δ1, may be used to estimate the under-exposure of second layer cutting elements.

At step 1318, the engineering tool may generate a preliminary layout for second-layer cutting elements 128*b* on secondary blades (2, 4, 6) using a selected track set configuration (e.g., front track set or opposite track set) and geometries including, but not limited to, predetermined cutter density, back rake and side rake. An estimate of initial under-exposure may be made based on past simulations for drill bit 501 with the selected cutter configuration, e.g., opposite track set or front track set. For example, under-exposure $\delta_{128}$ for drill bit 501 as shown in FIG. 5A may be estimated to be approximately 0.045 inches as used in generating FIG. 5B. In some instances, the configuration may be based on the characteristics of the formation to be cut, BHA 120 that may be used, and/or directional data for the formation to be cut, such as kickoff location, radius to be cut, and direction that drill bit 501 will drill the formation.

At step 1320, the engineering tool may calculate a CDCCC based on the configuration of first-layer cutting elements 128*a* and second-layer cutting elements 128*b* using method 700 defined in FIG. 7. For example, the CDCCC may resemble the curve illustrated in FIG. 8. Further, the CDCCC may be refined by adjustments of second-layer cutting elements 128*b* to increase smoothness of the curve. From the CDCCC, the engineering tool may define a minimum critical depth of cut (Δ2) as discussed above with respect to FIG. 8. Then, the engineering tool may calculate the minimum critical ROP using the formula and criteria discussed above with respect to FIG. 9.

At step 1322, the engineering tool may compare the critical depth of cut, Δ1, determined in step 1316 with a minimum critical depth of cut, Δ2. The engineering tool may determine if the absolute difference of Δ1 and Δ2 is smaller than a predetermined amount. If the difference between Δ1 and Δ2 is larger than a predetermined amount, then steps 1318 and 1320 may be repeated by adjusting at least the under-exposure of some of second-layer cutting elements 128*b* until the difference between Δ1 and Δ2 is smaller than a predetermined amount. Additionally, the engineering tool may compare the minimum critical ROP calculated at step 1320 with the ROP where second-layer cutting elements 128*b* engage the formation, ROP1. The engineering tool may determine if the absolute difference between the minimum critical ROP and ROP1 is smaller than a predetermined amount. If the difference between the minimum critical ROP and ROP1 is larger than a predetermined amount, then steps 1318 and 1320 may be repeated by adjusting at least the under-exposure of some of second-layer cutting elements 128*b* until the difference between the minimum critical ROP and ROP1 is smaller than a predetermined amount.

At step 1324, the engineering tool may run multiple simulations of drilling with first-layer and second-layer cutting elements. As part of the drilling simulations and using at least bit motor rotational speed RPM1 and formation strength, the engineering tool may generate a plot of ROP as a function of WOB and a plot of TOB as a function of WOB. The formation strength may be estimated based on testing or other similar drilling operations.

At step 1326, the engineering tool may calculate the cutting area, forces of each cutting element at various drilling conditions. At this step, WOB2 and WOB3 may also be obtained. At step 1328, the engineering tool may determine if additional DOCC elements may be desirable to control depth of cut within Zone D of FIG. 3. If additional DOCC elements are desired, at step 1330, the engineering tool may determine locations and place the additional DOCC elements. Then, the engineering tool may return to step 1324 and run a drilling simulation to obtain new plots of ROP as a function of WOB and TOB as a function of WOB.

At step 1332, the engineering tool may perform a final check to see if the design requirements are met. The design requirements may include determining if the shape of the ROP as a function of WOB approximates the curve shown in FIG. 3. If the design requirements are not met, steps 1306 and 1330 may be repeated. Following step 1332, method 1300 may end.

Modifications, additions, or omissions may be made to method 1300 without departing from the scope of the present disclosure. For example, the order of the steps may be performed in a different manner than that described and some steps may be performed at the same time. Additionally, each individual step may include additional steps without departing from the scope of the present disclosure.

Although the present disclosure has been described with several embodiments, various changes and modifications may be suggested to one skilled in the art. For example, although the present disclosure describes the configurations of blades and cutting elements with respect to drill bits, the same principles may be used to optimize directional and horizontal drilling of any suitable drilling tool according to the present disclosure. It is intended that the present disclosure encompasses such changes and modifications as fall within the scope of the appended claims.

What is claimed is:

1. A method of designing a multi-profile layer drill bit to provide directional and horizontal drilling, the method comprising:
    placing a plurality of first-layer cutting elements on a plurality of primary blades disposed on exterior portions of a bit body;
    defining a cutting element configuration selected from the group consisting of a front track set configuration and an opposite track set configuration;
    estimating a first weight on bit where the first-layer cutting elements begin to engage a formation during drilling;
    estimating a second weight on bit where a plurality of second-layer cutting elements begin to engage a formation during drilling based on a formation characteristic of a wellbore and a rotation speed of a motor associated with the drill bit, the second weight on bit being greater than the first weight on bit;
    determining an amount of under-exposure of the second-layer cutting elements with respect to the first-layer cutting elements; and
    placing the second-layer cutting elements on a plurality of secondary blades according to the defined cutting element configuration and the determined under-exposure in order to prevent the motor from stalling during sliding mode drilling.

2. The method of claim 1, wherein the formation characteristic includes a formation strength.

3. The method of claim 2, further comprising estimating the formation strength based on a prior test of the drill bit or a prior drilling operation.

4. The method of claim 1, wherein placing the first-layer cutting elements on the primary blades comprises adjusting at least one of location, density, back rake, and side rake.

5. The method of claim 4, wherein the location, density, back rake, and side rake is adjusted if a design requirement for the drill bit is not satisfied, wherein the design requirement is at least one of a force balance condition and a cutter force distribution.

6. The method of claim 1, wherein placing the second-layer cutting elements on the secondary blades is based at least on a torque provided by the motor associated with the drill bit.

7. The method of claim 1, further comprising:
generating a critical depth of cut control curve for the second-layer cutting elements;
calculating a minimum critical rate of penetration based on the critical depth of cut control curve; and
reconfiguring the second-layer cutting elements on the secondary blades if the minimum critical rate of penetration is not approximately equal to a rate of penetration where the second-layer cutting elements engage the formation during drilling.

8. The method of claim 7, wherein reconfiguring the second-layer cutting elements comprises adjusting the determined under-exposure between the second-layer cutting elements and the first-layer cutting elements.

9. The method of claim 7, further comprising reconfiguring the second-layer cutting elements to refine the critical depth of cut control curve.

10. The method of claim 7, wherein the critical depth of cut control curve is generated by:
selecting a radial swath of the drill bit, the radial swath defined between a first radial coordinate and a second radial coordinate; and
calculating an overall critical depth of cut at a radial coordinate on the radial swath between the first radial coordinate and the second radial coordinate based on a minimum critical depth of cut of a plurality of control points on the second-layer cutting elements.

11. The method of claim 1, wherein the front track set configuration comprises the second-layer cutting elements located in front of the first-layer cutting elements with respect to a direction of rotation of the drill bit.

12. The method of claim 1, wherein the opposite track set configuration comprises the second-layer cutting elements located substantially opposite from the first-layer cutting elements with respect to a direction of rotation of the drill bit.

13. The method of claim 1, wherein the second-layer cutting elements are configured to control a rate of penetration such that the second-layer cutting elements engage a formation during drilling at a desired weight on bit.

14. The method of claim 1, wherein the second-layer cutting elements are configured to control a depth of cut such that the second-layer cutting elements engage a formation during drilling at a desired weight on bit.

15. The method of claim 1, further comprising placing a plurality of depth of cut controllers on at least one of the primary blades or the secondary blades, the depth of cut controllers configured to control depth of cut.

16. The method of claim 15, wherein the plurality of depth of cut controllers are placed to control depth of cut based on a cutting area of the first-layer cutting elements and second-layer cutting elements.

17. The method of claim 1, further comprising:
calculating a critical depth of cut of the second-layer cutting elements based on the rotation speed;
defining a minimum critical depth of cut; and
adjusting the amount of under-exposure between at least one the second-layer cutting elements and the first-layer cutting elements if the minimum critical depth of cut is not approximately equal to the calculated critical depth of cut.

18. The method of claim 1, wherein determining the amount of under-exposure between the second-layer cutting elements and the first-layer cutting elements is based on a bottom hole assembly to be used with the drill bit.

19. The method of claim 1, wherein determining the amount of under-exposure between the second-layer cutting elements and the first-layer cutting elements is based on a kickoff location in the wellbore.

20. The method of claim 1, wherein the number of the plurality of primary blades and the plurality of secondary blades is based on directional data for the formation to be cut by the drill bit.

* * * * *

UNITED STATES PATENT AND TRADEMARK OFFICE
CERTIFICATE OF CORRECTION

PATENT NO. : 10,590,711 B2
APPLICATION NO. : 16/039690
DATED : March 17, 2020
INVENTOR(S) : Shilin Chen It is certified that error appears in the above-identified patent and that said Letters Patent is hereby corrected as shown below:

On the Title Page

Item [73] Assignee: Please delete "Multi-Chem Group, LLC, Houston, TX (US)" and replace with --Halliburton Energy Services, Inc., Houston, TX (US)--

Signed and Sealed this
Tenth Day of May, 2022

Katherine Kelly Vidal
*Director of the United States Patent and Trademark Office*